US009407367B2

(12) United States Patent
Guo et al.

(10) Patent No.: US 9,407,367 B2
(45) Date of Patent: Aug. 2, 2016

(54) METHODS AND DEVICES FOR TRANSMITTING/OBTAINING INFORMATION BY VISIBLE LIGHT SIGNALS

(71) Applicant: Beijing Guo Cheng Wan Tong Information Technology Co. Ltd., Beijing (CN)

(72) Inventors: Cheng Guo, Beijing (CN); Hong Hu, Beijing (CN)

(73) Assignee: Beijing Guo Cheng Wan Tong Information Co. Ltd, Beijing (CN)

( * ) Notice: Subject to any disclaimer, the term of this patent is extended or adjusted under 35 U.S.C. 154(b) by 0 days.

(21) Appl. No.: 14/142,278

(22) Filed: Dec. 27, 2013

(65) Prior Publication Data
US 2014/0321859 A1    Oct. 30, 2014

(30) Foreign Application Priority Data

Apr. 25, 2013  (CN) .......................... 2013 1 0148797

(51) Int. Cl.
*H04B 10/00* (2013.01)
*H04B 10/116* (2013.01)
(52) U.S. Cl.
CPC .................................. *H04B 10/116* (2013.01)
(58) Field of Classification Search
CPC ..................................... H04B 10/114–10/1149
USPC .......................................................... 398/172
See application file for complete search history.

(56) References Cited

U.S. PATENT DOCUMENTS 5,193,201 A * 3/1993 Tymes .......................... 708/191
5,748,895 A * 5/1998 Shiff et al. .................... 713/100
7,415,212 B2 * 8/2008 Matsushita et al. ........... 398/140
(Continued)

FOREIGN PATENT DOCUMENTS

CN    102224692 A    10/2011
CN    102227883 A    10/2011
(Continued)

OTHER PUBLICATIONS

Machine Translation of CN 102749072 (A), dated Oct. 24, 2012; Applicant Easyway Co Ltd.
(Continued)

*Primary Examiner* — Agustin Bello
(74) *Attorney, Agent, or Firm* — Banner & Witcoff, Ltd.

(57) ABSTRACT

The present invention discloses methods and devices for transmitting/obtaining information by visible light signals. The method for transmitting information by visible light signals of two or more wavelengths from light sources comprises: modulating, on the basis of the information to be transmitted, two or more driving signals of the light sources to obtain two or more modulated driving signals for driving the light sources to emit the visible light signals of two or more wavelengths having their levels changed between peak levels and bottom levels with different frequencies and/or different phases and/or different amplitudes; and emitting the visible light signals of two or more wavelengths having their levels changed between peak levels and bottom levels with different frequencies and/or different phases and/or different amplitudes on the basis of the two or more modulated driving signals, so as to transmit information corresponding to a pattern of color stripes shown in an image obtained from the visible light signals.

7 Claims, 44 Drawing Sheets

(56) References Cited

U.S. PATENT DOCUMENTS

| | | | |
|---|---|---|---|
| 7,583,901 B2* | 9/2009 | Nakagawa et al. | 398/183 |
| 7,949,259 B2* | 5/2011 | Suzuki | 398/172 |
| 8,107,825 B2* | 1/2012 | Rajagopal et al. | 398/172 |
| 8,248,467 B1* | 8/2012 | Ganick et al. | 348/116 |
| 8,334,901 B1* | 12/2012 | Ganick et al. | 348/131 |
| 8,436,896 B2* | 5/2013 | Staats et al. | 348/61 |
| 8,457,502 B2* | 6/2013 | Ryan et al. | 398/172 |
| 8,515,289 B2* | 8/2013 | Maxik et al. | 398/172 |
| 8,520,065 B2* | 8/2013 | Staats et al. | 348/61 |
| 8,538,276 B2* | 9/2013 | Shimada et al. | 398/202 |
| 8,620,163 B1* | 12/2013 | Sleator | 398/118 |
| 2004/0161246 A1* | 8/2004 | Matsushita et al. | 398/187 |
| 2006/0056855 A1* | 3/2006 | Nakagawa et al. | 398/183 |
| 2007/0254694 A1* | 11/2007 | Nakagwa et al. | 455/556.1 |
| 2008/0253766 A1* | 10/2008 | Yu et al. | 398/41 |
| 2009/0171571 A1* | 7/2009 | Son et al. | 701/208 |
| 2010/0135671 A1* | 6/2010 | Park et al. | 398/172 |
| 2010/0247112 A1 | 9/2010 | Chang | |
| 2011/0008062 A1* | 1/2011 | Ashdown | 398/212 |
| 2011/0105134 A1* | 5/2011 | Kim et al. | 455/450 |
| 2011/0299857 A1* | 12/2011 | Rekimoto | 398/172 |
| 2012/0194699 A1* | 8/2012 | Kouno | 348/229.1 |
| 2012/0294624 A1 | 11/2012 | Noh et al. | |
| 2012/0327139 A1* | 12/2012 | Margulis | 345/690 |
| 2013/0015785 A1 | 1/2013 | Kamada et al. | |
| 2013/0028609 A1* | 1/2013 | Staats et al. | 398/130 |
| 2013/0028612 A1 | 1/2013 | Ryan et al. | |
| 2013/0126618 A1* | 5/2013 | Gao | 235/469 |
| 2013/0126713 A1* | 5/2013 | Haas et al. | 250/208.2 |
| 2013/0141555 A1 | 6/2013 | Ganick et al. | |
| 2013/0195273 A1* | 8/2013 | Lord | 380/270 |
| 2013/0202301 A1* | 8/2013 | Ago et al. | 398/58 |
| 2013/0202310 A1* | 8/2013 | Rietman et al. | 398/128 |
| 2013/0272716 A1* | 10/2013 | Lopez et al. | 398/127 |
| 2013/0272717 A1* | 10/2013 | Deguchi et al. | 398/154 |
| 2013/0279919 A1* | 10/2013 | Yokoi | 398/183 |
| 2013/0329006 A1* | 12/2013 | Boles et al. | 348/42 |
| 2013/0330088 A1* | 12/2013 | Oshima et al. | 398/130 |
| 2014/0037295 A1* | 2/2014 | Pederson et al. | 398/115 |

FOREIGN PATENT DOCUMENTS

| | | |
|---|---|---|
| CN | 102749072 A | 10/2012 |
| WO | 2006/077968 A1 | 7/2006 |

OTHER PUBLICATIONS

Feb. 17, 2015—(US) Non-Final Office Action U.S. Appl. No. 14/246,460.
Jun. 30, 2015—(US) Non-Final Office Action U.S. Appl. No. 14/246,460.
Nov. 16. 2015—(US) Final Office Action U.S. Appl. No. 14/246,460.
Jun. 30, 2015—(CN) First Office Action—App 201410168806.1.

* cited by examiner

METHODS AND DEVICES FOR TRANSMITTING/OBTAINING INFORMATION BY VISIBLE LIGHT SIGNALS

TECHNICAL FIELD

The present invention generally relates to the field of visible light communication, and particularly relates to methods and devices for transmitting/obtaining information by visible light signals.

BACKGROUND

Visible light communication is a communication technology which uses the variation of visible light (color, intensity, or position) to transmit information. Such communication technology for transmitting information is based on high-frequency blinking visible lights. In particular, information to be transmitted is firstly compiled into a digital signal; this digital signal is then applied to modulate the driving current or driving voltage of the light source by pulse width modulation (PWM), so that the light source blinks in high frequencies. This high-frequency blinking signal can be detected by a photosensitive device, for example, an image sensor such as a photodiode, and can be restored back into the transmitted information. The main advantages of this visible light communication technology are high confidentiality, no occupancy of wireless channel resources, low cost, and easy integration with LED.

One of the existing visible light communication technologies is based on the "rolling shutter" mechanism of image sensors. In such sensors, different parts of the sensor, each row or each column, are exposed at different times. Based on this feature, when taking pictures of a light source with rapidly changing brightness, the image sensor with a rolling shutter can deliver an image which contains bright and dark stripes. By measuring the width, the number, or the gray scale of the stripes, the transmitted information can be restored. However, this method has the following drawbacks: the width of the stripes can be affected by local over-exposure of the image sensor, for instance, stripes may become narrower within the over-exposed area; coding only based on the changing numbers of the stripe will lead to a low communication rate; and different background lighting conditions may induce uncertainties for measuring the gray scale.

SUMMARY

Objects of the present invention are to provide technical solutions for transmitting information by visible light signals or obtaining information from visible light signals, which obviate at least one of the above-mentioned disadvantages.

According to a first aspect of the present invention, there is provided a method for transmitting information by visible light signals of two or more wavelengths from light sources, the method comprising: modulating, on the basis of the information to be transmitted, two or more driving signals of the light sources to obtain two or more modulated driving signals for driving the light sources to emit the visible light signals of two or more wavelengths having their levels changed between peak levels and bottom levels with different frequencies and/or different phases and/or different amplitudes; and emitting the visible light signals of two or more wavelengths having their levels changed between peak levels and bottom levels with different frequencies and/or different phases and/or different amplitudes on the basis of the two or more modulated driving signals, so as to transmit information corresponding to a pattern of color stripes shown in an image obtained from the visible light signals.

According to some embodiments of the present invention, modulating on the basis of the information to be transmitted two or more driving signals of the light sources to obtain two or more modulated driving signals comprises: modulating, on the basis of the information to be transmitted, two or more driving voltages or two or more driving currents of the light sources to obtain a first set of modulated driving voltages or a first set of modulated driving currents.

According to some embodiments of the present invention, the first set of modulated driving currents are respectively greater than un-modulated driving currents, so that luminous flux of the light sources driven by the first set of modulated driving currents is equal to luminous flux of light sources driven by the un-modulated driving currents According to some embodiments of the present invention, emitting the visible light signals on the basis of a second set of modulated driving currents which are greater than un-modulated driving currents together with a high frequency carrier wave signal, so that luminous flux of the light sources driven by the second set of modulated driving currents is constant among periods comprising peak levels and bottom levels.

According to some embodiments of the present invention, the information corresponding to the pattern of color stripes comprises data bits, which comprise data corresponding to the number, color, brightness, or arranging order of the color stripes According to some embodiments of the present invention, the information corresponding to the pattern of color stripes further comprises one or more start bits and/or one or more error correction bits, the start bits being used to identify a start position of a set of data bits, and the error correction bits being used to check error in the data bits.

According to some embodiments of the present invention, modulating on the basis of the information to be transmitted two or more driving signals of the light sources to obtain two or more modulated driving signals comprises: modulating the frequencies and/or phases and/or amplitudes of the two or more driving signals to obtain two or more modulated driving signals.

According to some embodiments of the present invention, the color stripes in the image are derived from combination of the visible light signals having two or more wavelengths.

According to a second aspect of the present invention, there is provided a method for obtaining information from visible light signals of two or more wavelengths from light sources, the method comprising: obtaining an image from the visible light signals of two or more wavelengths having their levels changed between peak levels and bottom levels with different frequencies and/or different phases and/or different amplitudes emitted by the light sources; measuring a pattern of color stripes in the image obtained from the visible light signals; and obtaining information corresponding to the pattern of the color stripes.

According to some embodiments of the present invention, obtaining an image comprises obtaining the image by an image capturing device comprising an image sensor whose exposure mode is rolling shutter mode, and a sampling rate of the rolling shutter is higher than the frame rate of the image sensor.

According to some embodiments of the present invention, obtaining an image comprises capturing on an image sensor with a rolling shutter the image in which different portions of the image sensor are exposed at different time points.

According to some embodiments of the present invention, the visible light signals are emitted by the light sources on the basis of the modulated driving signals, which drive the light sources to emit the visible light signals having their levels changed between peak levels and bottom levels with different frequencies and/or different phases and/or different amplitudes.

According to some embodiments of the present invention, the light sources are one or more sets of light sources, and obtaining an image from the visible light signals having their levels changed between peak levels and bottom levels with different frequencies and/or different phases and/or different amplitudes emitted by the light sources comprises: obtaining the image from the visible light signals having their levels changed between peak levels and bottom levels with different frequencies and/or different phases and/or different amplitudes emitted by the one or more sets of light sources, wherein one or more exposed regions in the image correspond to the one or more sets of light sources; measuring a pattern of the color stripes in the image obtained from the visible light signals comprises: measuring patterns of the color stripes of the one or more exposed regions in the image; and obtaining information corresponding to the pattern of the color stripes comprises: obtaining the information corresponding to the patterns of the color stripes of the one or more exposed regions in the image.

According to some embodiments of the present invention, the color stripes in the image are derived from a combination of the visible light signals having two or more wavelengths.

According to a third aspect of the present invention, there is provided a light source for transmitting information by visible light signals of two or more wavelengths, comprising: a modulator configured to modulate, on the basis of the information to be transmitted, two or more driving signals of the light source to obtain two or more modulated driving signals for driving the light source to emit the visible light signals of two or more wavelengths having their levels changed between peak levels and bottom levels with different frequencies and/or different phases and/or different amplitudes; and an emitter configured to emit the visible light signals of two or more wavelengths having their levels changed between peak levels and bottom levels with different frequencies and/or different phases and/or different amplitudes on the basis of the two or more modulated driving signals, so as to transmit information corresponding to a pattern of color stripes shown in an image obtained from the visible light signals.

According to some embodiments of the present invention, the modulator is configured to modulate, on the basis of the information to be transmitted, two or more driving voltages or two or more driving currents of the light source to obtain a first set of modulated driving voltages or a first set of modulated driving currents.

According to some embodiments of the present invention, the first set of modulated driving currents are respectively greater than un-modulated driving currents, so that luminous flux of the light source driven by the first set of modulated driving currents is equal to luminous flux of light source driven by the un-modulated driving currents.

According to some embodiments of the present invention, the emitter is configured to emit the visible light signals on the basis of a second set of modulated driving currents which are greater than un-modulated driving currents together with a high frequency carrier wave signal, so that luminous flux of the light sources driven by the second set of modulated driving currents is constant among periods comprising peak levels and bottom levels.

According to some embodiments of the present invention, the information corresponding to the pattern of color stripes comprises data bits, which comprise data corresponding to the number, color, brightness, or arranging order of the color stripes.

According to some embodiments of the present invention, the information corresponding to the pattern of color stripes further comprises one or more start bits and/or one or more error correction bits, the start bits being used to identify a start position of a set of data bits, and the error correction bits being used to check error in the data bits.

According to some embodiments of the present invention, the modulator is configured to modulate the frequencies and/or phases and/or amplitudes of the two or more driving signals to obtain two or more modulated driving signals.

According to some embodiments of the present invention, the color stripes in the image are derived from combination of the visible light signals having two or more wavelengths.

According to a fourth aspect of the present invention, there is provided a device for obtaining information from visible light signals of two or more wavelengths from light sources, the device comprising: an image sensor configured to obtain an image from the visible light signals of two or more wavelengths having their levels changed between peak levels and bottom levels with different frequencies and/or different phases and/or different amplitudes emitted by the light sources; a memory configured to store the image obtained by the image sensor; and a processor configured to measure a pattern of color stripes in the image stored in the memory and obtain information corresponding to the pattern of the color stripes.

According to some embodiments of the present invention, an exposure mode of the image sensor is rolling shutter mode, and a sampling rate of the rolling shutter is higher than the frame rate of the image sensor.

According to some embodiments of the present invention, the image sensor is an image sensor with a rolling shutter and is configured to obtain the image from the visible light signals in which different portions of the image sensor are exposed at different time points.

According to some embodiments of the present invention, the visible light signals are emitted by the light sources on the basis of the modulated driving signals, which drive the light sources to emit the visible light signals having their levels changed between peak levels and bottom levels with different frequencies and/or different phases and/or different amplitudes.

According to some embodiments of the present invention, the light sources are one or more sets of light sources, and the image sensor is configured to obtain the image from the visible light signals having their levels changed between peak levels and bottom levels with different frequencies and/or different phases and/or different amplitudes emitted by the one or more sets of light sources, wherein one or more exposed regions in the image correspond to the one or more sets of light sources; and the memory is configured to store the image obtained by the image sensor; and the processor is configured to measure patterns of the color stripes of the one or more exposed regions in the image, and obtain information corresponding to the patterns of the color stripes of the one or more exposed regions in the image.

According to some embodiments of the present invention, the color stripes in the image are derived from combination of the visible light signals having two or more wavelengths.

In conclusion, the embodiments of the present invention provide an efficient and effective approach for transmitting/obtaining information, which can transmit/obtain information much faster, and the information transmitted/obtained may contain more data bits. As compared to the white light transmission having only two choices of transmitting or not transmitting white light representing "1" or "0", which can only transmit data of 1 bit during a unit of time, according to embodiments of the present invention with visible light signals of two or more wavelengths emitting light signals of multiple colors, data of more bits can be transmitted during a unit of time, for example, 24 bits data for three colors RGB. Further, taking advantages of different frequencies and/or different phases and/or different amplitudes of visible light signals, more data can be transmitted during a unit of time.

BRIEF DESCRIPTION OF THE DRAWINGS

The accompanying drawings are included to provide a further understanding of embodiments and constitute a part of this description. The drawings illustrate embodiments and together with the description serve to explain principles of embodiments. The elements of the drawings are not necessarily to scale relative to each other. Similar reference numerals designate corresponding similar parts. It should be expressly understood that the drawings are included for illustrative purposes and do not in any manner limit the scope of the present invention.

DETAILED DESCRIPTION

In the following description, for purposes of explanation rather than limitation, specific details, such as the particular architecture, structure, techniques, etc., are set forth for illustration. However, it will be apparent to those of ordinary skill in the art that other embodiments that depart from these specific details would still be understood to be within the scope of the present invention. Moreover, for the purpose of clarity, detailed descriptions of well-known devices, circuits, and methods are omitted so as not to obscure the description of the present invention. It is to be understood that the features of the various exemplary embodiments described herein may be combined with each other, unless specifically noted otherwise.

Figure 1:
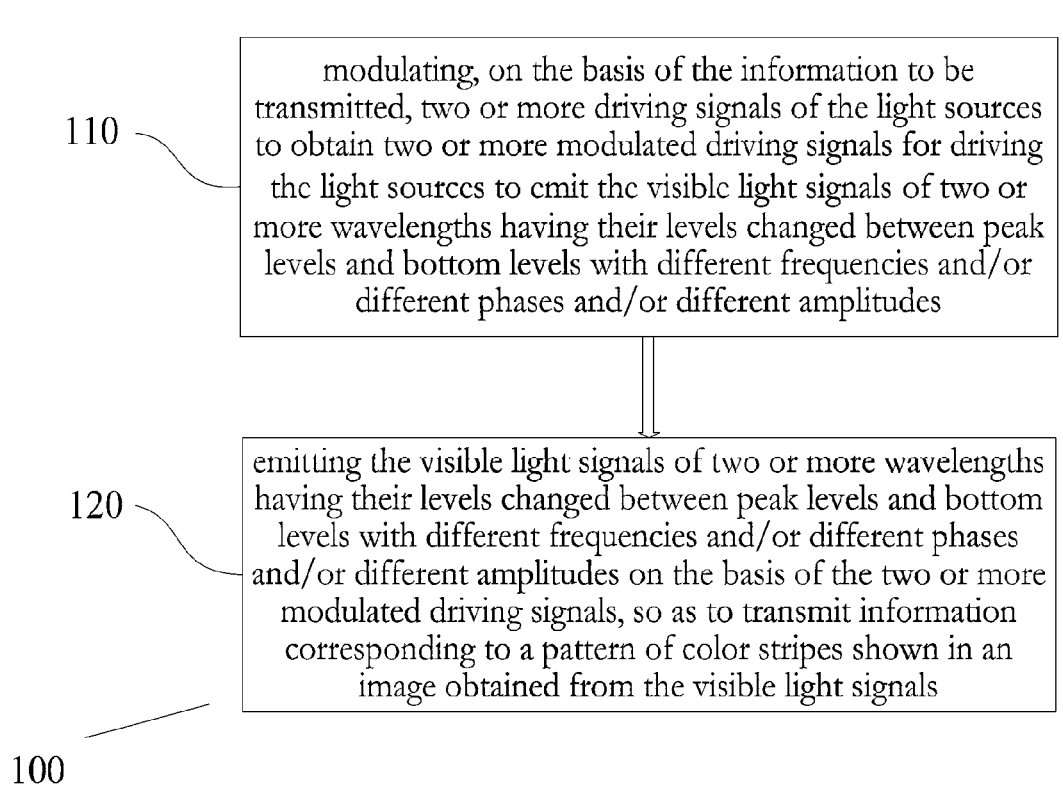
FIG. 1 is a flow chart illustrating a method 100 for transmitting information by visible light signals according to an embodiment of the present invention.

According to a first aspect of the present invention, there is provided a method for transmitting information by visible light signals. FIG. 1 is a flow chart illustrating a method 100 for transmitting information by visible light signals according to an embodiment of the present invention.

As shown in FIG. 1, the method 100 begins with a step 110 of modulating, on the basis of the information to be transmitted, two or more driving signals of the light sources to obtain two or more modulated driving signals for driving the light sources to emit the visible light signals of two or more wavelengths having their levels changed between peak levels and bottom levels with different frequencies and/or different phases and/or different amplitudes.

According to some embodiments of the present invention, the light sources may be any type of light sources emitting visible light signals, for example, LED, fluorescent, or incandescent lamps.

According to some embodiments of the present invention, the information transmitted by visible light signals may be any type of information, for example, data such as text, picture, audio, video data, the identifier (ID) of the light source, and other information.

According to some embodiments of the present invention, the light sources may contain different light emitting components to emit the visible light signals of two or more wavelengths. For example, the light sources may contain red (R), green (G) or blue (B) components, and can be driven to emit light with RGB colors which may be captured by an image sensor as an image containing a pattern of color stripes (red, green, yellow, blue, pink, cyan, white, black) where different colors represent different codes containing the information to be transmitted.

According to some embodiments of the present invention, the driving signals of the light sources may be in the forms of square wave, sine wave, triangle wave, wave on a higher-frequency carrier, the aforesaid waves containing DC component, or in other forms of waves.

According to some embodiments of the present invention, the two or more driving signals of the light sources may be modulated by Pulse Width Modulation (PWM). Generally, the pulse duration is fixed, and the duty of the signal can be modulated, wherein the duty in a pulse cycle (such as square wave) is the ratio of the positive pulse duration (i.e., duration of the positive part) to the total duration.

According to some embodiments of the present invention, the step 110 may comprise: modulating, on the basis of the information to be transmitted, two or more driving voltages or two or more driving currents of the light sources to obtain a first set of modulated driving voltages or a first set of modulated driving currents. And the first set of modulated driving voltages or the first set of modulated driving currents may be used to drive the light sources to emit the visible light signals of two or more wavelengths having their levels changed between peak levels and bottom levels with different frequencies and/or different phases and/or different amplitudes.

According to some embodiments of the present invention, the step 110 may comprise: modulating the frequencies and/or phases and/or amplitudes (i.e., one, two or all the three of the frequencies, phases and amplitudes) of the two or more driving signals to obtain two or more modulated driving signals.

Figure 2:
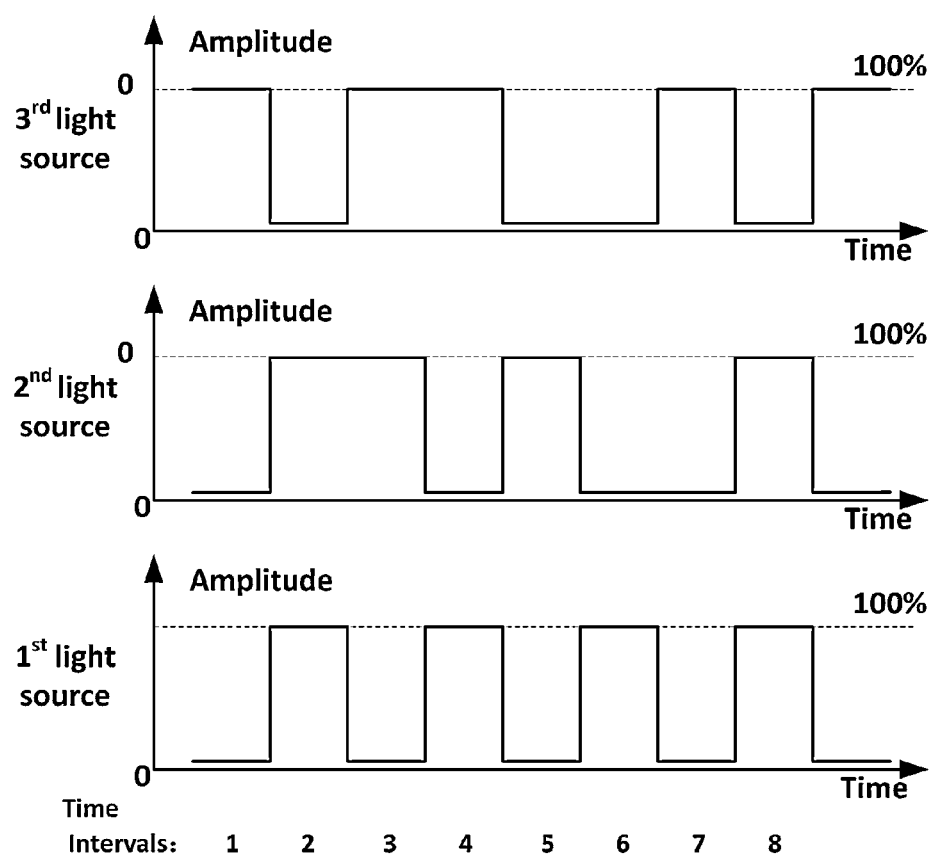
FIG. 2 is the schematic diagram of the driving signals for driving the light sources modulated by On-Off Keying (OOK) according to an embodiment of the present invention.

According to some embodiments of the present invention, the driving signals for driving the light sources may be modulated by On-Off Keying (OOK). FIG. 2 is a schematic diagram of the driving signals for driving the light sources modulated by OOK according to an embodiment of the present invention. The driving signals for driving the first, second and third light sources containing red (R), green (G) and blue (B) components, respectively, are modulated by OOK to switch between "1" and "0", on the basis of the information to be transmitted. Optionally, the driving signals may be driving currents or driving voltages, and thus on the basis of the information to be transmitted, the driving currents/voltages for driving three light sources may be modulated, as shown in FIG. 2, to obtain a first set of modulated driving currents. Driven by the first set of modulated driving currents/voltages, the three light sources may respectively emit visible lights with RGB colors having their levels changed between peak levels and bottom levels with different frequencies.

In different time intervals 1-8, there are different combinations of the visible light signals of different colors generating different color stripes shown in an image. For instance, in time interval 1, the first light source and the second light source are at "0", the third light source is at "1", and the emitted light is blue, which is the color of the third light source. In time interval 3, the first light source is at "0", the second light source and the third light source are at "1", and the emitted light is cyan, which is the combined color of the second and third light sources.

Figure 3A:
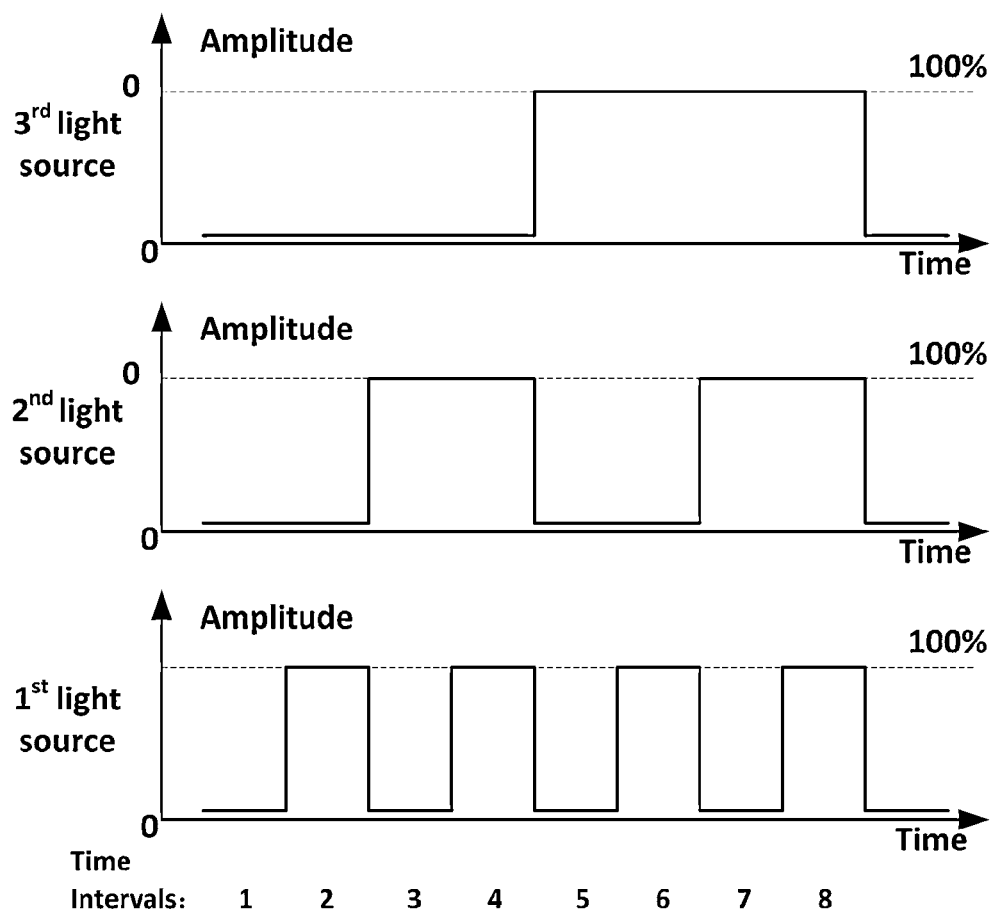
FIG. 3A is a schematic diagram of the driving signals for driving the light sources modulated by OOK according to another embodiment of the present invention.

FIG. 3A is a schematic diagram of the driving signals for driving the light sources modulated by OOK according to another embodiment of the present invention. The modulated driving signals are obtained by modulating the driving signals for driving the first, second and third light sources containing red (R), green (G) and blue (B) components, respectively. Optionally, on the basis of the information to be transmitted, the driving currents for driving three light sources may be modulated by OOK as shown in FIG. 3A, to obtain a first set of modulated driving currents. Driven by the first set of modulated driving currents, the three light sources may respectively emit visible lights with RGB colors having their levels changed between peak levels and bottom levels with different frequencies. Alternatively, the driving voltages for driving three light sources may be modulated to obtain a first set of modulated driving voltages for driving the light sources to emit visible lights with RGB colors having their levels changed between peak levels and bottom levels with different frequencies.

Some embodiments of the present invention will be exemplarily described with the condition that the first, second, and third light sources contains red (R), green (G), and blue (B) components respectively. It should be noted by those skilled in the art that these RGB light sources are only an example, and the scope of the present invention is not thus limited. Further, the number of the light sources is not limited to three.

As shown in FIG. 1, after the step 110 described hereinbefore, step 120 of the method 100 is performed, wherein the visible light signals of two or more wavelengths having their levels changed between peak levels and bottom levels with different frequencies and/or different phases and/or different amplitudes are emitted on the basis of the two or more modulated driving signals, so as to transmit information corresponding to a pattern of color stripes shown in an image obtained from the visible light signals.

According to some embodiments of the present invention, the color stripes in the image are derived from combination of the visible light signals having two or more wavelengths.

According to some embodiments of the present invention, the information corresponding to the pattern of color stripes comprises data bits, which comprise data corresponding to the number, color, brightness, or arranging order of the color stripes.

Figure 3B:
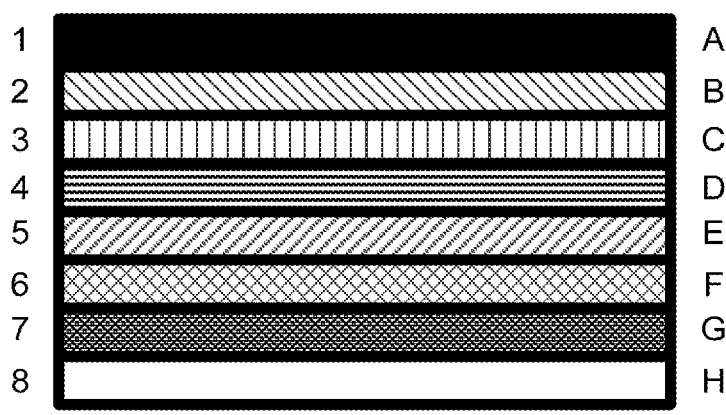
FIG. 3B is a schematic diagram of an image obtained from the visible light signals according to an embodiment of the present invention.

Referring to FIG. 3A again, in different intervals 1-8, there are different combinations of the visible light signals of different colors generating different color stripes shown in an image. For instance, in time interval 3, the first light source and the third light source are off, and the emitted light is green, which is the color of the second light source, and a color stripe C corresponding to the emitted green light in time interval 3 is obtained in an image, as shown in FIG. 3B in which different colors are denoted by different patterns. In time interval 5, the first light source and the second light source are off, and the emitted light is blue, which is the color of the third light source, and color stripe E corresponding to the emitted blue light in time interval 5 is obtained in an image, as shown in FIG. 3B. In time interval 7, the first light source is off, and the emitted light color is pink, which is a mixed color of the second and third light sources, and a color stripe G corresponding to the emitted pink light in time interval 7 is obtained in an image, as shown in FIG. 3B.

Similarly, driven by the first set of modulated driving currents shown in FIG. 3A, the visible light signals emitted by the three light sources may have eight different kinds of combinations in different intervals 1-8, as shown in FIG. 3A. Derived from eight combinations of three light sources, a pattern of eight ($2^3=8$) different color stripes A-H can be generated, as shown in FIG. 3B with each stripe representing 3 bits (e.g., 000, 001, 010, 011, 100, 101, 110, or 111), and thus the information of 8*3=24 bits may be transmitted by the pattern. It should be noted by those skilled in the art that the number of the light sources is not limited to three, and there may be two, four or more light sources. When there are n light sources with different colors, a pattern of $2^n$ different color stripes can be generated with each stripe representing n bits.

According to some embodiments of the present invention, the width of the stripe in the pattern is determined by the highest frequency among the light sources. For example, the width of the stripe in the pattern as shown in FIG. 3B is determined by the frequency of the first light source which is the highest frequency among the first, second and third light sources.

Figure 4:
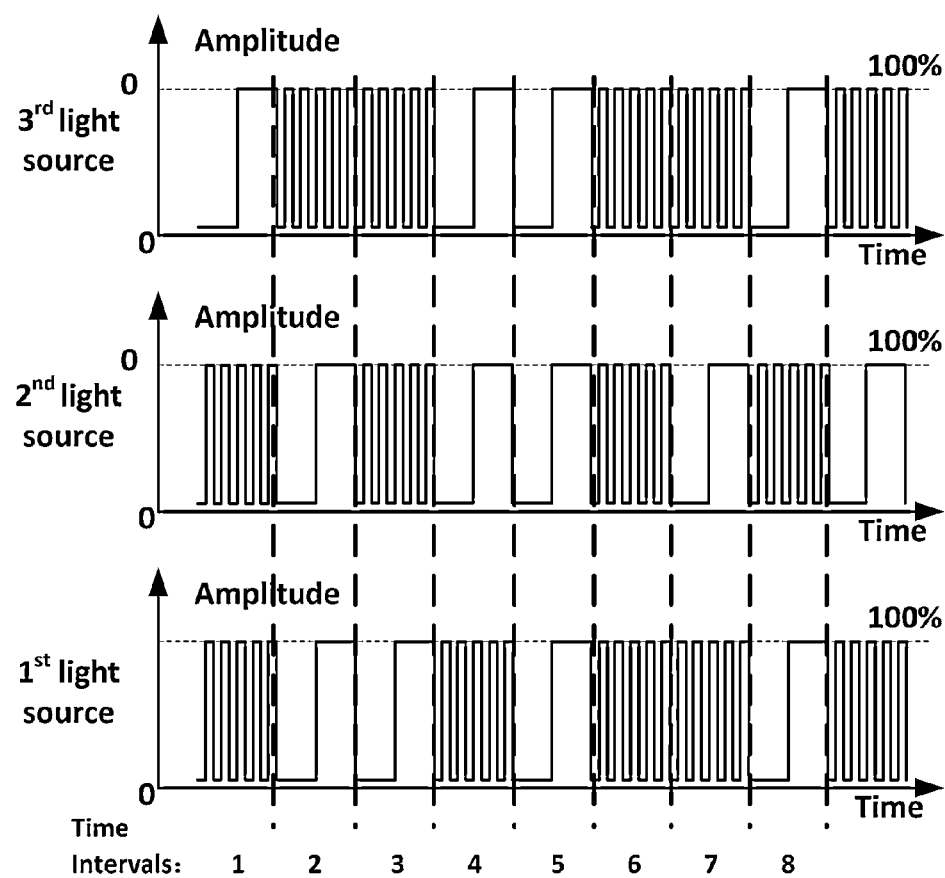
FIG. 4 is a schematic diagram of the modulated driving signals for driving the light sources obtained by modulating the frequencies of the driving signals according to another embodiment of the present invention.

Alternatively, the modulated driving signals may be obtained by modulating the frequencies of the driving signals in other manners. FIG. 4 is a schematic diagram of the modulated driving signals for driving the light sources according to another embodiment of the present invention. As shown in FIG. 4, the frequency of the driving signal of each light source is modulated, such that the driving signals of the light sources may have different frequency values in different intervals. Optionally, visible light signals driven by driving signals with different frequency values may represent different symbols, for example, a visible light signal driven by a driving signal with higher frequency value may represent a symbol "1", and a visible light signals driven by a driving signal with lower frequency value may represent a symbol "0". The visible light signals emitted by the three light sources may have more different kinds of combinations in different intervals 1-8, as compared to those shown in FIG. 3A. Derived from the more combinations of three light sources, a pattern of more different color stripes can be generated (not shown) and thus the information of more bits may be transmitted.

According to some embodiments of the present invention, the modulated driving signals for driving the light sources may also be obtained by modulating the amplitudes of the driving signals.

Figure 5:
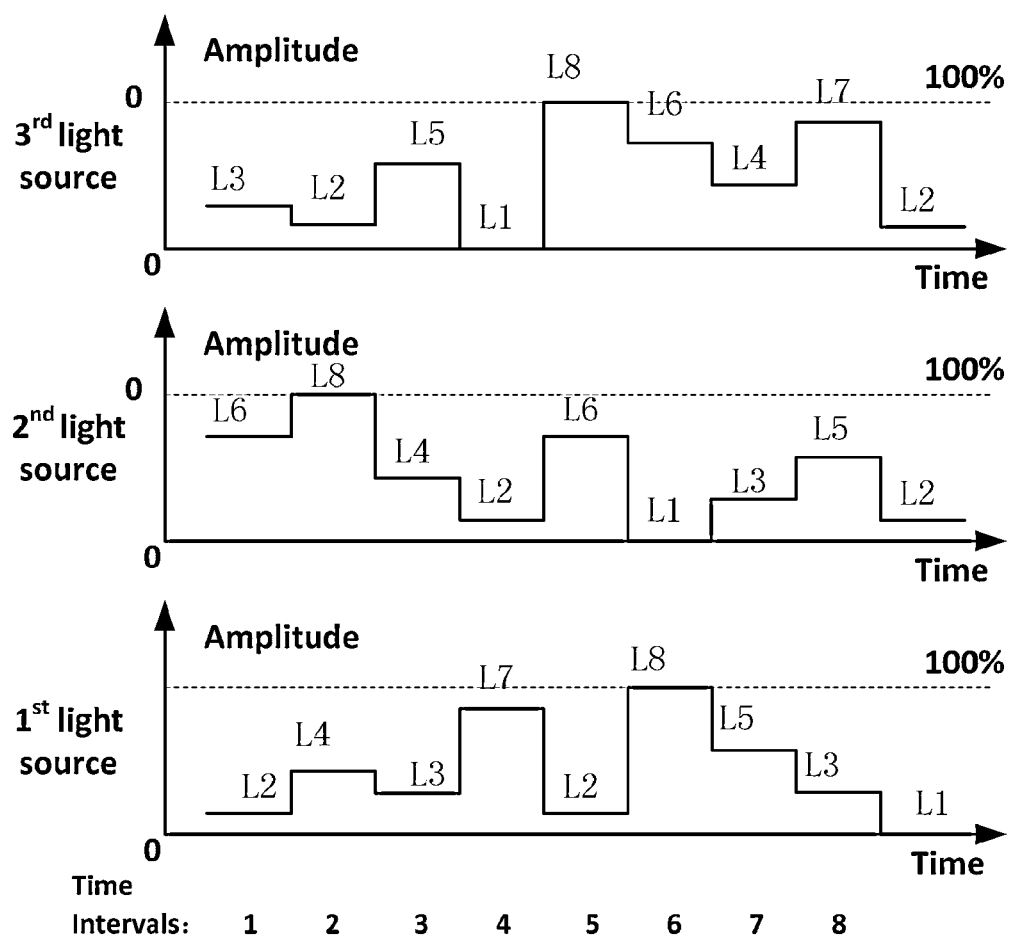
FIG. 5 is a schematic diagram of the modulated driving signals for driving the light sources obtained by modulating the amplitudes of the driving signals for driving the light sources according to an embodiment of the present invention.

FIG. 5 is a schematic diagram of the modulated driving signals for driving the light sources according to an embodiment of the present invention. The modulated driving signals are obtained by modulating the amplitudes of the driving signals for driving the first, second and third light sources containing red (R), green (G) and blue (B) components, respectively. Three light sources may emit visible light signals with different colors and different intensities. The visible light signals with different amplitudes may be obtained by modulating the amplitudes of the driving currents of the light sources. Driven by the first set of modulated driving currents, the three light sources may respectively emit visible lights with RGB colors having their levels changed between peak levels and bottom levels with different amplitudes.

Driven by the first set of modulated driving currents, the light sources may emit the visible light signals of different colors with different amplitudes. In different intervals 1-8, there are different combinations of the visible light signals of different colors generating different color stripes shown in an image. For instance, the driving currents of each light source may be modulated to have 8 levels of amplitudes in different intervals. From completely shutting down which is 0 to completely turning on which is 1, the 8 levels are equally distributed and denoted as L1, L2, . . . , L7, and L8. Optionally, for example in the OOK modulation, the driving currents of each light source may be modulated to have only 2 levels of amplitudes in different intervals, that is, completely shutting down which is 0 and completely turning on which is 1.

In time interval 2, the first light source R emits visible light with amplitude L4 which gives visible light signal of 1L4, the second light source G emits visible light with amplitude L8 which gives visible light signal of 2L8, and the third light source B emits visible light with amplitude L2 which gives visible light signal of 3L2. The visible light signals emitted by the three light sources in time interval 2 are the combination of 1L4, 2L8 and 3L2, which is corresponding to a stripe in the image.

In time interval 5, the first light source R emits visible light with amplitude L2 which gives visible light signal of 1L2, the second light source G emits visible light with amplitude L6 which gives visible light signal of 2L6, and the third light source B emits visible light with amplitude L8 which gives visible light signal of 3L8. The visible light signals emitted by the three light sources in time interval 5 are the combination of 1L2, 2L6 and 3L8, which is corresponding to a stripe in the image.

With three light sources each having 8 different levels of amplitudes, there are $8^3$=512 different kinds of combination of the visible light signals emitted by the three light sources. Derived from 512 combinations of three light sources, a pattern of 512 different color stripes can be generated (not shown) with each stripe representing 9 bits. It should be noted by those skilled in the art that the number of the light sources is not limited to three, and there may be two, four or more light sources. When there are n light sources with different colors with each light source having m levels of amplitudes, a pattern of $m^n$ different color stripes can be generated with each stripe representing $n*\log_2 m$ bits.

According to some embodiments of the present invention, the modulated driving signals for driving the light sources may also be obtained by modulating the phases of the driving signals.

Figure 6:
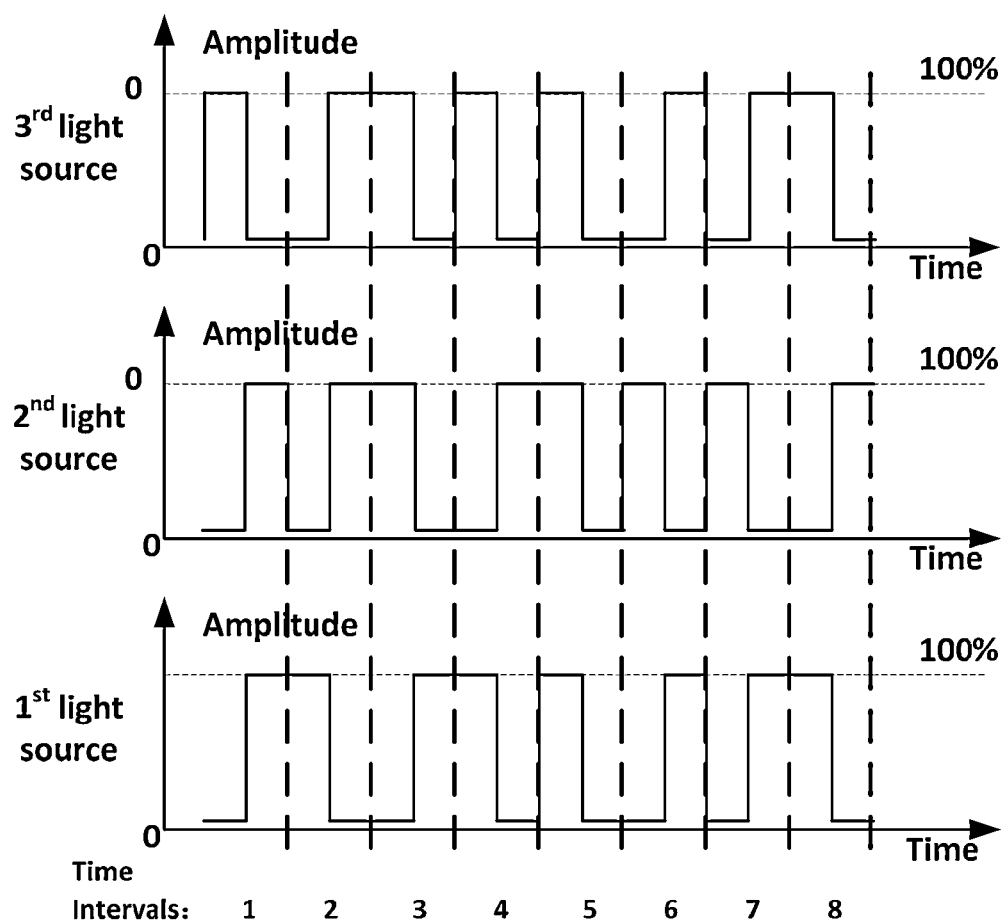
FIG. 6 is a schematic diagram of the modulated driving signals for driving the light sources obtained by modulating the phases of the driving signals for driving the light sources according to an embodiment of the present invention.

FIG. 6 is a schematic diagram of the modulated driving signals for driving the light sources according to an embodiment of the present invention. The modulated driving signals are obtained by modulating the phases of the driving signals for driving the first, second and third light sources containing red (R), green (G) and blue (B) components, respectively. Three light sources may emit visible light signals with different colors and different phases. The visible light signals with different phases may be obtained by modulating the phases of the driving currents of the light sources. Driven by the first set of modulated driving currents, the three light sources may respectively emit visible lights with RGB colors having their levels changed between peak levels and bottom levels with different phases.

Driven by the first set of modulated driving currents, the light sources may emit the visible light signals of different colors with different phases. In different intervals 1-8, there are different combinations of the visible light signals of different colors generating different color stripes shown in an image.

For instance, as shown in FIG. 6, in time interval 1, the first light source R turns from dark to bright, the second light source G turns from dark to bright, and the third light source B turns from bright to dark. And thus the visible lights emitted by the three light sources turns from blue to yellow. In time interval 3, the first light source R turns from dark to bright, the second light source G turns from bright to dark, and the third light source B turns from bright to dark. And thus the visible lights emitted by the three light sources turns from cyan to red.

With three light sources each having 2 different kinds of alternations, that is, from bright to dark and from dark to bright, there are $2^3$=8 different kinds of combinations of the visible light signals emitted by the three light sources in different intervals 1-8. Derived from 8 combinations of three light sources, a pattern of 8 different color stripes can be generated (not shown) with each stripe representing 3 bits (e.g., 000, 001, 010, 011, 100, 101, 110, or 111). It should be noted by those skilled in the art that the number of the light sources is not limited to three and there may be two, four or more light sources. It should be also noted by those skilled in the art that the above alternations of the light sources by modulating phases of driving signals, that is, from bright to dark and from dark to bright, are only for exemplary purpose, but are not limitations to the present invention. According to embodiments of the present invention, the light sources may have other alternations by modulating phases of driving signals, such as, from bright to bright and from dark to dark where the phases of driving signals are not changed. When there are n light sources with different colors with each light source having m kinds of alternations, a pattern of $m^n$ different color stripes can be generated with each stripe representing $n*\log_2 m$ bits.

According to some embodiments of the present invention, the modulated driving signals for driving the light sources may also be obtained by modulating the two or three of following features of the driving signals: frequencies, phases and amplitudes.

According to an embodiment, the modulated driving signals for driving the light sources may be obtained by modulating frequencies and amplitudes of the driving signals.

Figure 7:
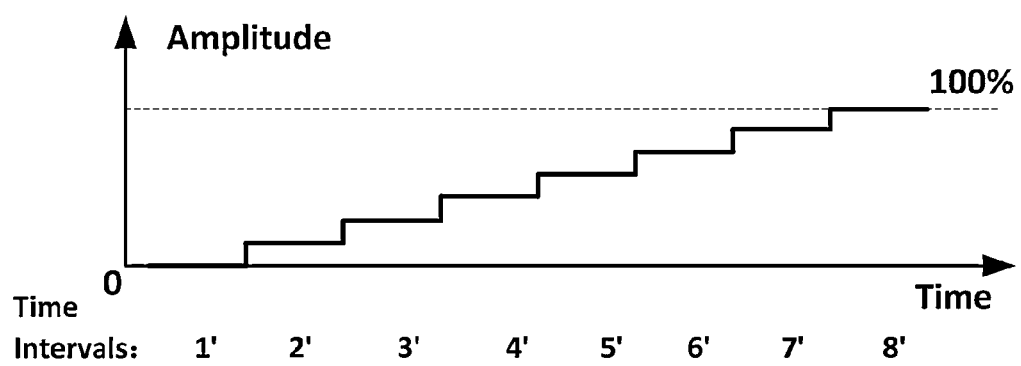
FIG. 7 is a schematic diagram of the modulated driving signals for driving the light sources obtained by modulating the amplitudes of the driving signal for driving one light source according to an embodiment of the present invention.
Figure 8:
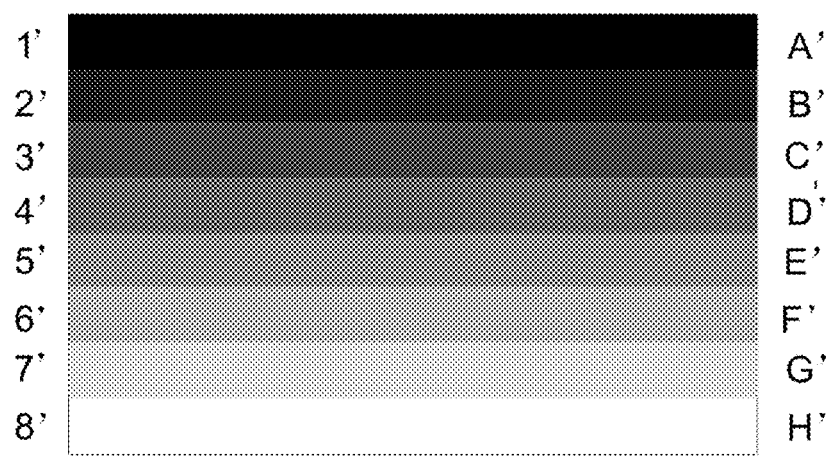
FIG. 8 is a schematic diagram of an image obtained from the visible light signals according to an embodiment of the present invention.

FIG. 7 is a schematic diagram of the modulated driving signal for driving the one light source according to an embodiment of the present invention. The modulated driving signal is obtained by modulating the amplitude of the driving signal, so that the modulated driving signal has different amplitudes in different intervals. Driven by such modulated driving signal, the light source may emit light with different intensities in different intervals and a pattern of stripes with different brightness can be captured in an image, as shown in FIG. 8. For instance, in time interval 1', the light source is off and the light intensity is 0%; at the same time, a stripe A' of 0% brightness is obtained in an image, as shown in FIG. 8. In time interval 2', the light intensity is 12.5%; at the same time, a stripe B' of 12.5% brightness is obtained in the image, as shown in FIG. 8. In time interval 3', the light intensity is 25%; at the same time, a stripe C' of 25% brightness is obtained in the image, as shown in FIG. 8, and so on. Driven by such modulated driving signal shown in FIG. 8, the visible light signal emitted by the light source may generate a pattern of stripes A'-H' having eight different levels of brightness in different intervals 1'-8', as shown in FIG. 8.

In the case where the driving signals for driving the three light sources of three colors are obtained by the frequencies which gives eight ($2^3$=8) different color stripes as shown in FIG. 3 with each stripe representing 3 bits (e.g., 000, 001, 010, 011, 100, 101, 110, or 111), and each driving signal for driving each light source is modulated by the amplitude which gives eight different levels of brightness as shown in FIG. 8.

Alternatively, the modulated driving signals for driving the light sources may also be obtained by modulating phases and amplitudes of the driving signals.

Figure 9:
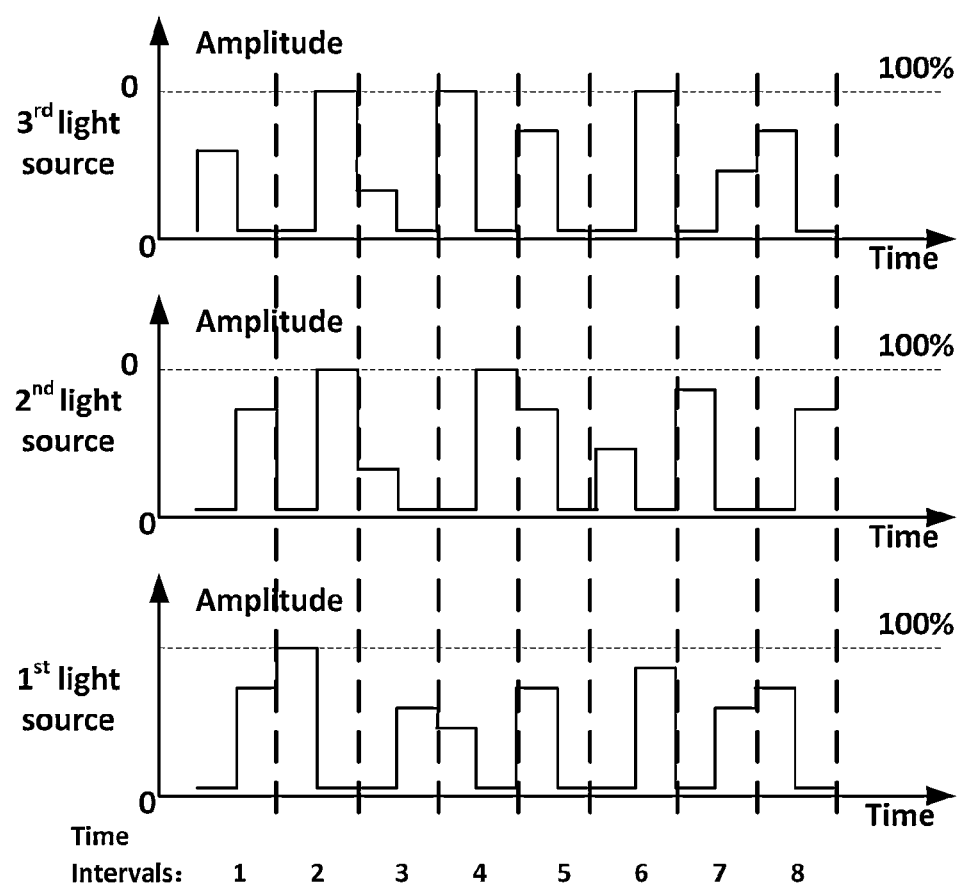
FIG. 9 is a schematic diagram of the modulated driving signals for driving the light sources obtained by modulating the phases and amplitudes of the driving signal for driving the light sources according to an embodiment of the present invention.

FIG. 9 is a schematic diagram of the modulated driving signals for driving the light sources according to an embodiment of the present invention. The modulated driving signals are obtained by modulating the phases and amplitudes of the driving signals for driving the first, second and third light sources containing red (R), green (G) and blue (B) components, respectively. Three light sources may emit visible light signals with different colors, different amplitudes and different phases. The visible light signals with different phases may be obtained by modulating the phases and amplitudes of the driving currents of the light sources. Driven by the first set of modulated driving currents, the light sources may emit the visible light signals of different colors with different phases as well as different amplitudes. In different intervals 1-8, there are different combinations of the visible light signals of different colors generating different color stripes shown in an image.

For instance, in time interval 3, the first light source R emits visible light with amplitude L5 which gives visible light signal of 1L5, the second light source G emits visible light with amplitude L3 which gives visible light signal of 2L3, and the third light source B emits visible light with amplitude L3 which gives visible light signal of 3L3; at the same time, the first light source R turns from dark to bright, the second light source G turns from bright to dark, the third light source B turns from bright to dark. Hence, in time interval 3, the visible light signals emitted by the three light sources are the combinations of the visible light signals of different colors generating a specific color stripe shown in an image.

In time interval 7, the first light source R emits visible light with amplitude L5 which gives visible light signal of 1L5, the second light source G emits visible light with amplitude L7 which gives visible light signal of 2L7, and the third light source B emits visible light with amplitude L4 which gives visible light signal of 3L4; at the same time, the first light source R turns from dark to bright, the second light source G turns from bright to dark, the third light source B turns from dark to bright. Hence, in time interval 7, the visible light signals emitted by the three light sources are the combinations of the visible light signals of different colors generating another specific color stripe shown in an image.

With three light sources each having 512 different combinations by modulating amplitudes and each having 2 different kinds of alternations (from bright to dark or from dark to bright) by modulating phases, there are 512*8=4096 different kinds of combinations of the visible light signals emitted by the three light sources in different intervals 1-8. Derived from 4096 combinations of three light sources, a pattern of 4096 different color stripes can be generated (not shown) with each stripe representing 12 bits. It should be noted by those skilled in the art that the number of the light sources is not limited to three and there may be two, four or more light sources. When there are n light sources with different colors with each light source having m kinds of alternations, by modulating amplitudes and phases, a pattern of $m'''$ different colors can be generated with each stripe representing $n*\log_2 m$ bits.

Alternatively, the modulated driving signals for driving the light sources may also be obtained by modulating frequencies and amplitudes of the driving signals.

Figure 10:
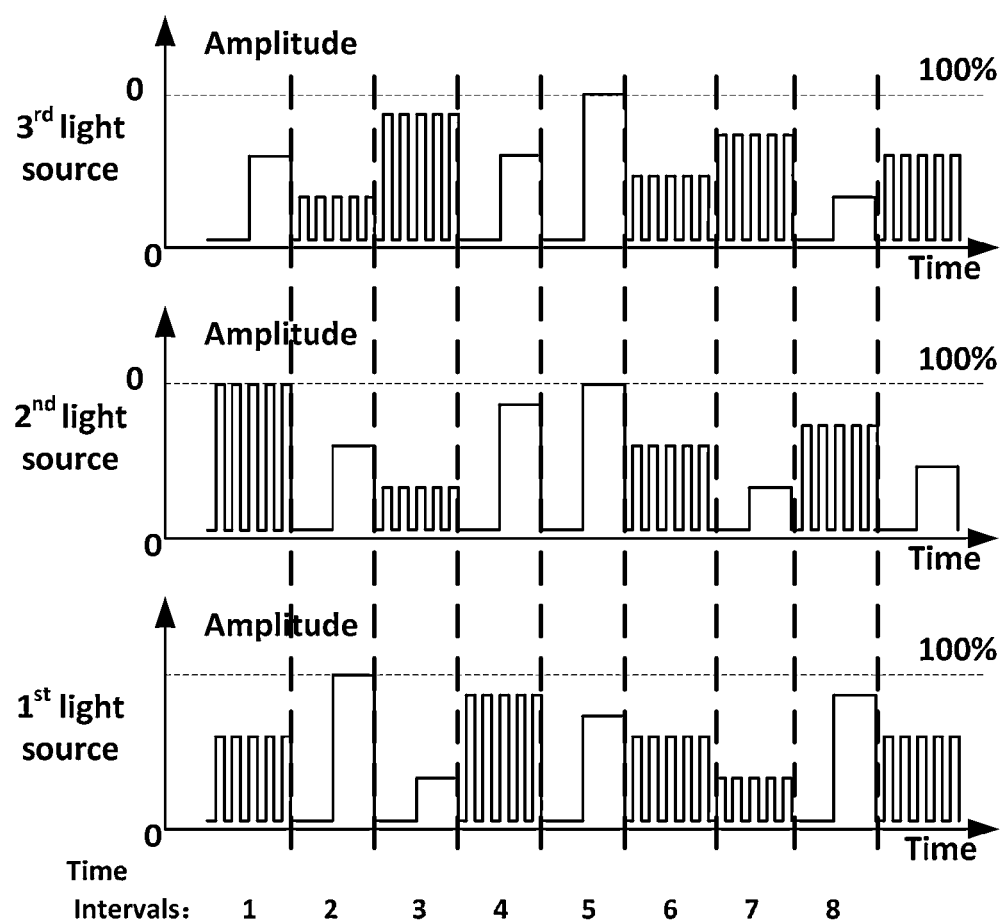
FIG. 10 is a schematic diagram of the modulated driving signals for driving the light sources obtained by modulating the frequencies and amplitudes of the driving signal for driving the light sources according to an embodiment of the present invention.

FIG. 10 is a schematic diagram of the modulated driving signals for driving the light sources according to an embodiment of the present invention. The modulated driving signals are obtained by modulating the frequencies and amplitudes of the driving signals for driving the first, second and third light sources containing red (R), green (G) and blue (B) components, respectively. Three light sources may emit visible light signals of different colors with different amplitudes and different frequencies. The visible light signals may be obtained by modulating the frequencies and amplitudes of the driving currents of the light sources. By modulating the amplitudes of the driving currents within a time interval, three light sources may emit visible light signals of different colors with different brightness. At the same time, by modulating the frequencies of the driving currents, the number of times that the light sources switch between bright and dark is controlled within the time interval. Optionally, when a light source switches between bright and dark at a frequency lower than the sampling rate of an image sensor, such as switches only once from dark to bright, within a time interval, in an image captured by the image sensor, it may generate a color stripe with a brightness corresponding to the amplitude of the peak level of the driving currents within the time interval, or a dark stripe corresponding to the bottom level of the driving currents within the time interval. Optionally, when a light source switches between bright and dark at a frequency higher than the sampling rate of an image sensor, it may generate a color stripe in the captured image, with a brightness corresponding to an intermediate amplitude below that of the peak level of the driving currents within the time interval. Driven by the first set of modulated driving currents, the light sources may emit the visible light signals of different colors with different frequencies as well as different amplitudes. In different intervals 1-8, there are different combinations of the visible light signals generating different color stripes shown in an image.

For instance, in time interval 2, the first light source R emits visible light with amplitude L8 which gives visible light signal of 1L8, the second light source G emits visible light with amplitude L4 which gives visible light signal of 2L5, and the third light source B emits visible light with amplitude L8 which gives visible light signal of 3L3; in time interval 2, the first light source R has low frequency and switches slowly between bright and dark, the second light source G has low frequency and switches slowly between bright and dark, and the third light source B has high frequency and switches fast between bright and dark. In time interval 2, the visible light signals emitted by the three light sources are the combinations of the visible light signals of different colors. The third light source switching fast between bright and dark may generate a color stripe in an image, with a brightness corresponding to an intermediate amplitude below that of the peak level of the driving currents within time interval 2. The first and second light sources switching slowly between bright and dark within the time interval 2 may generate a color stripe changing from dark to bright shown in an image.

In time interval 5, the first light source R emits visible light with amplitude L6 which gives visible light signal of 1L6, the second light source G emits visible light with amplitude L8 which gives visible light signal of 2L8, and the third light source B emits visible light with amplitude L8 which gives visible light signal of 3L8; in time interval 5, the first light source R has low frequency and switches slowly between bright and dark, the second light source G has low frequency and switches slowly between bright and dark, and the third light source B has low frequency and switches slowly between bright and dark. In time interval 5, the visible light signals emitted by the three light sources are the combinations of the visible light signals of different colors generating another specific color stripe shown in an image whose color is changing within time interval 5.

Due to 512 different combinations by modulating amplitudes and 8 different combinations by modulating frequencies, there are 512*8=4096 different kinds of combination of the visible light signals emitted by the three light sources in different intervals 1-8. Derived from 4096 combinations of three light sources, a pattern of 4096 different color stripes can be generated (not shown) with each stripe representing 12 bits. Of course, the number of the light sources is not limited to three and there may be two, four or more light sources. When there are n light sources with different colors with each light source having m kinds of alternations, by modulating amplitudes and frequencies, a pattern of $m^n$ different colors can be generated with each stripe representing $n*\log_2 m$ bits.

Alternatively, the modulated driving signals for driving the light sources are obtained by modulating frequencies and phases of the driving signals.

Figure 11:
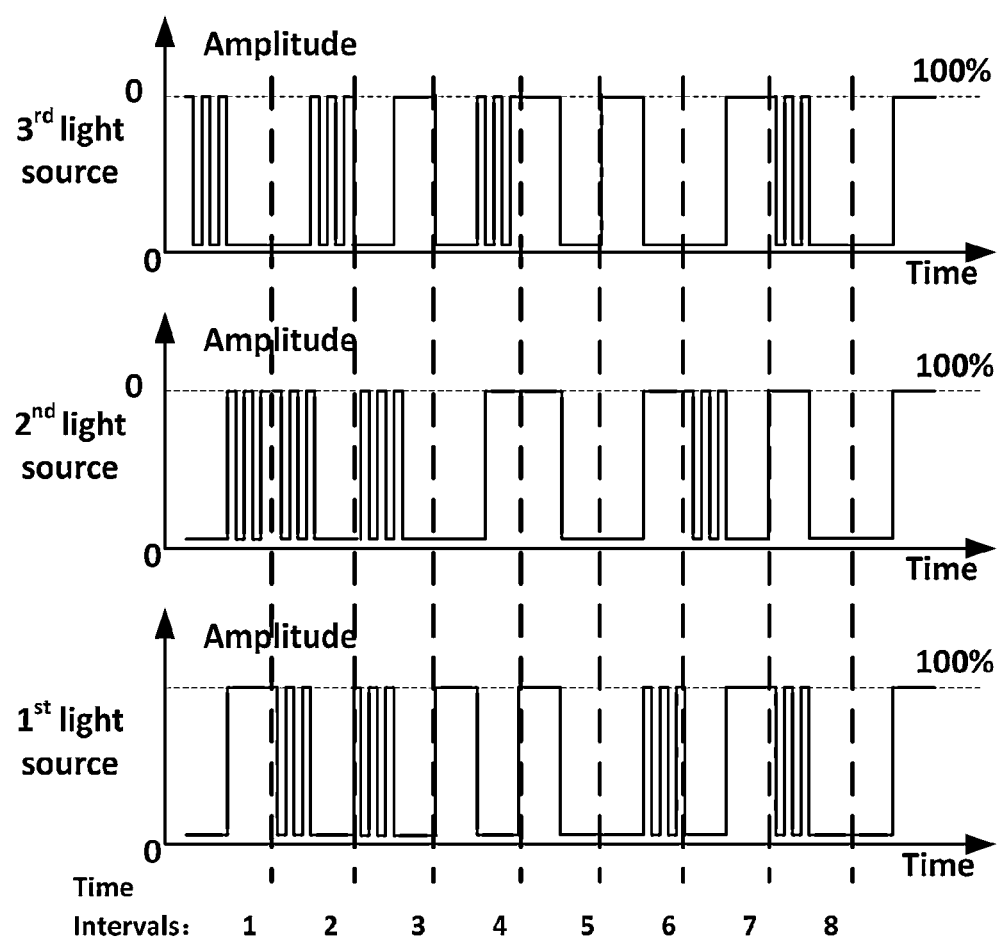
FIG. 11 is a schematic diagram of the modulated driving signals for driving the light sources obtained by modulating the frequencies and phases of the driving signal for driving the light sources according to an embodiment of the present invention.

FIG. 11 is a schematic diagram of the modulated driving signals for driving the light sources according to an embodiment of the present invention. The modulated driving signals are obtained by modulating the frequencies and phases of the driving signals for driving the first, second and third light sources containing red (R), green (G) and blue (B) components, respectively. Three light sources may emit visible light signals of different colors, different phases and different frequencies. The visible light signals may be obtained by modulating the frequencies and phases of the driving currents of the light sources. By modulating the phases of the driving currents within a time interval, the light sources may be controlled to emit visible light signals changing from bright to dark or from dark to bright. At the same time, by modulating the frequencies of the driving currents, the number of times that the light sources switch between bright and dark is controlled within the time interval. Optionally, when a light source switches between bright and dark at a frequency lower than the sampling rate of an image sensor, such as switches only once from dark to bright, within a time interval, in an image captured by the image sensor, it may generate a color stripe with a brightness corresponding to the amplitude of the peak level of the driving currents within the time interval, or a dark stripe corresponding to the bottom level of the driving currents within the time interval. Optionally, when a light source switches between bright and dark at a frequency higher than the sampling rate of an image sensor, it may generate a color stripe in the captured image, with a brightness corresponding to an intermediate amplitude below that of the peak level of the driving currents within the time interval. Driven by the first set of modulated driving currents, the light sources may emit the visible light signals of different colors with different frequencies as well as different phases. In different intervals 1-8, there are different combinations of the visible light signals of different colors generating different color stripes shown in an image.

For instance, in time interval 2, the first light source R has high frequency and switches from bright to dark, the second light source G has high frequency and switches from bright to dark, and the third light source B has high frequency and switches from dark to bright. In time interval 2, the visible light signals emitted by the three light sources are the combinations of the visible light signals of different colors generating a specific color stripe shown in an image whose color is changing within time interval 2.

In time interval 3, the first light source R has high frequency and switches from bright to dark, the second light source G has high frequency and switches from bright to dark, and the third light source B has low frequency and switches from dark to bright. In time interval 3, the visible light signals emitted by the three light sources are the combinations of the visible light signals of different colors generating a specific color stripe shown in an image whose color is changing within time interval 3.

In time interval 6, the first light source R has high frequency and switches from bright to dark, the second light source G has low frequency and switches from dark to bright, and the third light source B has low frequency and switches from bright to dark. In time interval 6, the visible light signals emitted by the three light sources are the combinations of the visible light signals of different colors generating a different color stripe shown in an image whose color is changing within time interval 6.

By modulating phases, each of the three light sources may switch from bright to dark or from dark to bright, giving $2^3$=8 different combinations. By modulating the frequencies, each of the three light sources may have low or high frequency, giving $2^3$=8 different combinations by modulating frequencies. Thus, there are 8*8=64 different kinds of combination of the visible light signals emitted by the three light sources in different intervals 1-8. Derived from 64 combinations of three light sources, a pattern of 64 different color stripes can be generated (not shown) with each stripe representing 6 bits. Of course, the number of the light sources is not limited to three and there may be two, four or more light sources. When there are n light sources with different colors with each light source having m kinds of alternations, by modulating phases and frequencies, $m^n$ different color stripes can be generated with each stripe representing $n*\log_2 m$ bits.

According to some embodiments of the present invention, besides the data bits, the information corresponding to the pattern of color stripes may further comprise one or more start bits and/or one or more error correction bits. The start bits may be used to identify a start position of a set of data bits, and the error correction bits may be used to check error in the data bits.

Figure 12:
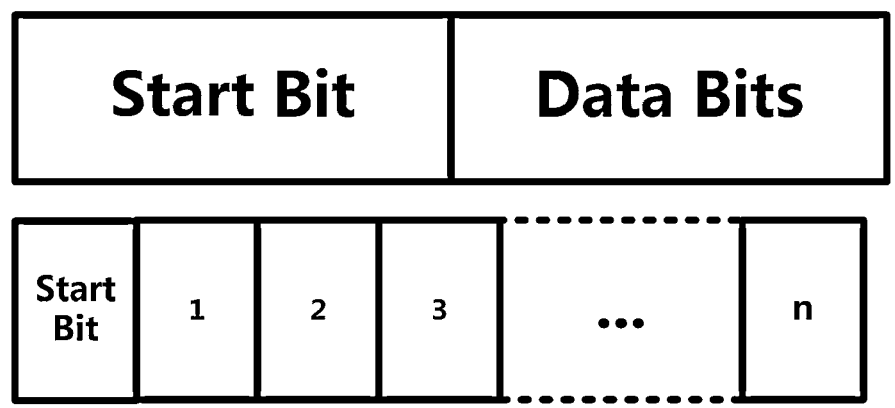
FIG. 12 is a schematic diagram of the information corresponding to the pattern of color stripes comprising a start bit according to an embodiment of the present invention.

FIG. 12 is a schematic diagram of the information corresponding to the pattern of color stripes comprising a start bit according to an embodiment of the present invention. As shown in FIG. 12, a start bit is added at the beginning of the data bits. Alternatively, more than one start bits may be included.

Figure 13:
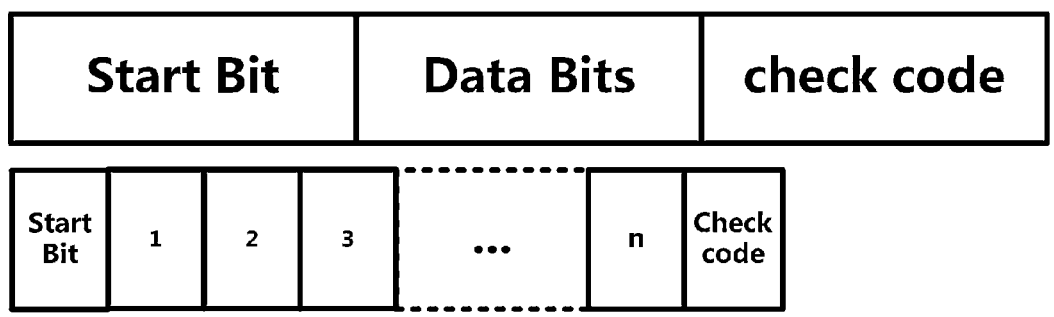
FIG. 13 is a schematic diagram of the information corresponding to the pattern of color stripes comprising an error correction bit according to an embodiment of the present invention.

FIG. 13 is a schematic diagram of the information corresponding to the pattern of color stripes comprising a start bit and an error correction bit according to an embodiment of the present invention. As shown in FIG. 13, besides a start bit, an error correction bit is also added at the end of the data bits. Alternatively, more than one error correction bits may be included. Alternatively, the one or more error correction bits may be added to the data bits without the start bit.

According to some embodiments of the present invention, the first set of modulated driving currents are respectively greater than un-modulated driving currents, so that luminous flux of the light sources driven by the first set of modulated driving currents is equal to luminous flux of light sources driven by the un-modulated driving currents.

The luminous flux is the measure of the power of light emitted by the light source during unit time, and is proportional to the area below the wave of the driving signal, the variation of which is sensitive to human eye. The driving signals may be modulated with the first set of modulated driving currents greater than un-modulated driving currents, so that luminous flux of the light sources is constant throughout the transmission of information to avoid blinking.

Figure 14A:
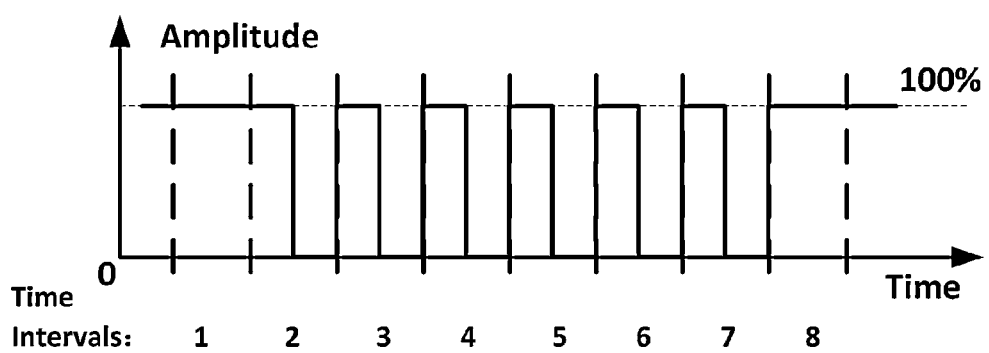
FIG. 14A is a schematic diagram of a modulated driving current of a light source equal to the un-modulated driving current according to an embodiment of the present invention.

FIG. 14A is a schematic diagram of a modulated driving current of a light source equal to the un-modulated driving current according to an embodiment of the present invention. It can be assumed that the luminous flux of the light source driven by the un-modulated driving currents is 100%. Assuming that the width of the peak levels and bottom levels of the modulated driving current may be 0.1 ms respectively, and the modulated driving current is equal to the un-modulated driving current, the luminous flux of the light source driven by the modulated driving current shown in FIG. 14A can be calculated to be (0.1*0+0.1*1)*100%/(0.1+0.1)=50%. The luminous flux 50% of the light source driven by the modulated driving current is lower than that of the light source driven by the un-modulated driving current (100%), causing undesirable blinking of the light source detectable by human eye.

Figure 14B:
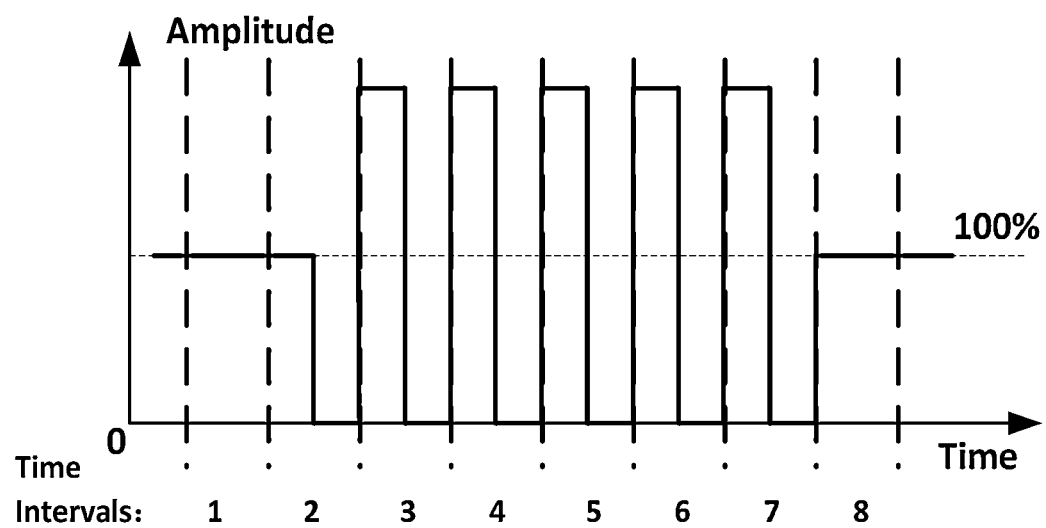
FIG. 14B is a schematic diagram of a modulated driving current greater than the un-modulated driving current according to an embodiment of the present invention.

FIG. 14B is a schematic diagram of a modulated driving current greater than the un-modulated driving current according to an embodiment of the present invention. Still, assuming that the width of the peak levels and bottom levels of the modulated driving current is 0.1 ms, respectively, and the modulated driving current is twice of the un-modulated driving current, the luminous flux of the light source driven by the modulated driving current shown in FIG. 14B can be calculated to be (0.1*0+0.1*2)*100%/(0.1+0.1)=100%. The luminous flux 100% of the light source driven by the modulated driving current is equal to the luminous flux 100% of light source driven by the un-modulated driving current, avoiding undesirable blinking of the light source detectable by human eye. It should be noted that, the values provide in the embodiments of the present invention are theoretical values for illustrative purposes, but not actual values. The actual values may vary due to the parameters of different devices.

According to some embodiments of the present invention, the method may comprise a step of emitting the visible light signals on the basis of a second set of modulated driving currents which are greater than un-modulated driving currents together with a high frequency carrier wave signal, so that the luminous flux of the light sources driven by the second set of driving currents is constant among periods comprising peak levels and bottom levels.

Figure 14C:
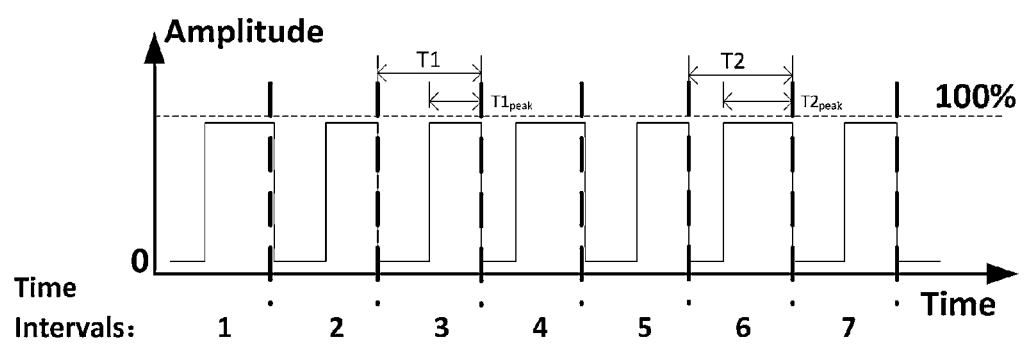
FIG. 14C is a schematic diagram of a modulated driving current greater than the un-modulated driving current without a high frequency carrier wave signal according to an embodiment of the present invention.

FIG. 14C is a schematic diagram of a modulated driving current greater than the un-modulated driving current without high frequency carrier wave signal according to an embodiment of the present invention. As shown in FIG. 14C, the driving current may be modulated to have different periods comprising different patterns of peak levels and bottom levels to represent different symbols. Optionally, within different periods, the peak levels and bottom levels may have different durations of peak levels and bottom levels for transmitting different symbols, resulting in different luminous fluxes of the light source driven by the modulated driving current, causing the light source to blink. For example, as shown in FIG. 14C, within one period T1 transmitting a symbol "1", the driving current is modulated to have a total duration of peak level of $T1_{peak}=\frac{1}{2}*T1$, giving a luminous flux of 50%; and within another period T2 transmitting a symbol "0", the driving current is modulated to have a total duration of peak level of $T2_{peak}=\frac{2}{3}*T2$, giving a luminous flux of 66.7%. Therefore, the luminous flux within T1 transmitting symbol "1" is less than that within T2 transmitting symbol "0", causing the light source to blink.

Figure 14D:
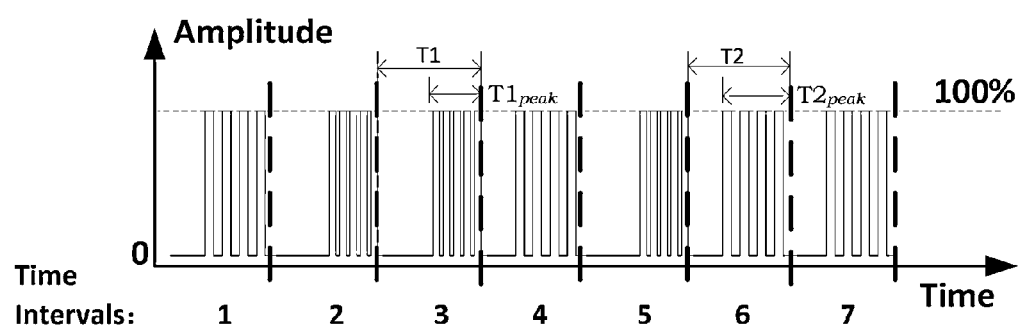
FIG. 14D is a schematic diagram of a modulated driving current greater than the un-modulated driving current together with a high frequency carrier wave signal according to an embodiment of the present invention.

In order to avoid the blinking of the light source when transmitting different symbols, the driving currents which are greater than un-modulated driving current is further modulated with a high frequency carrier wave signal. By modulating with a high frequency carrier wave signal, within different periods, the durations of peak levels and bottom levels of the driving current for transmitting different symbols are same, giving the same luminous flux among periods comprising the peak levels and bottom levels, and thus avoiding the blinking of the light source. For example, as shown in FIG. 14D, within one period T1 transmitting symbol "1", the driving current is further modulated with a high frequency carrier wave to have a total duration of peak levels of $T1_{peak}=\frac{1}{2}*T1*66.7\%$, giving a luminous flux of 33.3%; within one period T2 transmitting symbol "0", the driving current is further modulated with a high frequency carrier wave to have a total duration of peak levels of $T2_{peak}=\frac{2}{3}*T2*50\%$, giving a luminous flux of 33.3%. Therefore, the luminous flux within T1 transmitting symbol "1" is equal to that within T2 transmitting symbol "0", avoiding undesirable blinking of the light source detectable by human eye.

It should be noted by those skilled in the art that the frequencies, waveforms, or widths of the peak levels and bottom levels of the modulated driving current are not limited to the above exemplary values, but may be set to have any values as required. Similarly, the frequencies, waveforms, or widths of the peak levels and bottom levels of the high frequency signal wave signal are not limited to the above exemplary values, but may be set to have any values as required.

Figure 15:
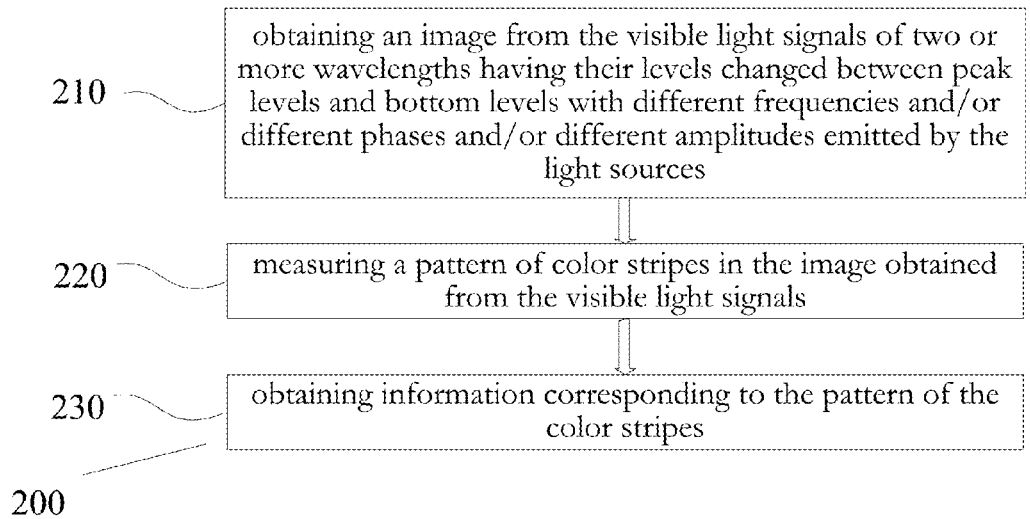
FIG. 15 is a flow chart illustrating a method for obtaining information from visible light signals of two or more wavelengths from light sources according to an embodiment of the present invention.

According to a second aspect of the present invention, there is provided a method for obtaining information from visible light signals. FIG. 15 is a flow chart illustrating a method 200 for obtaining information from visible light signals of two or more wavelengths from light sources according to an embodiment of the present invention.

As shown in FIG. 15, the method 200 begins with a step 210 of obtaining an image from the visible light signals of two or more wavelengths having their levels changed between peak levels and bottom levels with different frequencies and/or different phases and/or different amplitudes emitted by the light sources.

According to some embodiments of the present invention, the visible light signals may be emitted by the light sources on the basis of the modulated driving signals, which drive the light sources to emit the visible light signals having their levels changed between peak levels and bottom levels with different frequencies and/or different phases and/or different amplitudes, as described hereinbefore in details with respect to the method 100.

According to some embodiments of the present invention, the modulated driving signals may be obtained by modulating the frequencies and/or phases and/or amplitudes of the driving signals for driving the light sources to emit the visible light signals, as described hereinbefore in details with respect to the method 100. Optionally, the modulated driving signals may be modulated by the PWM scheme. Optionally, the modulated driving signals may be modulated driving voltages or modulated driving currents.

Optionally, the modulated driving currents may be greater than un-modulated driving currents, so that luminous flux of the light sources driven by the modulated driving currents is equal to luminous flux of light sources driven by the un-modulated driving currents, as described hereinbefore in details with respect to the method 100 making reference to FIG. 14B.

Optionally, the modulated driving currents may be greater than un-modulated driving currents together with a high frequency carrier wave signal, so that the luminous flux of the light sources driven by the driving currents is constant among periods comprising peak levels and bottom levels, as described hereinbefore in details with respect to the method 100 making reference to FIGS. 14C and 14D.

The above embodiments have been described in details previously with respect to the method 100, and will not be iterated herein for the sake of conciseness.

Figure 16:
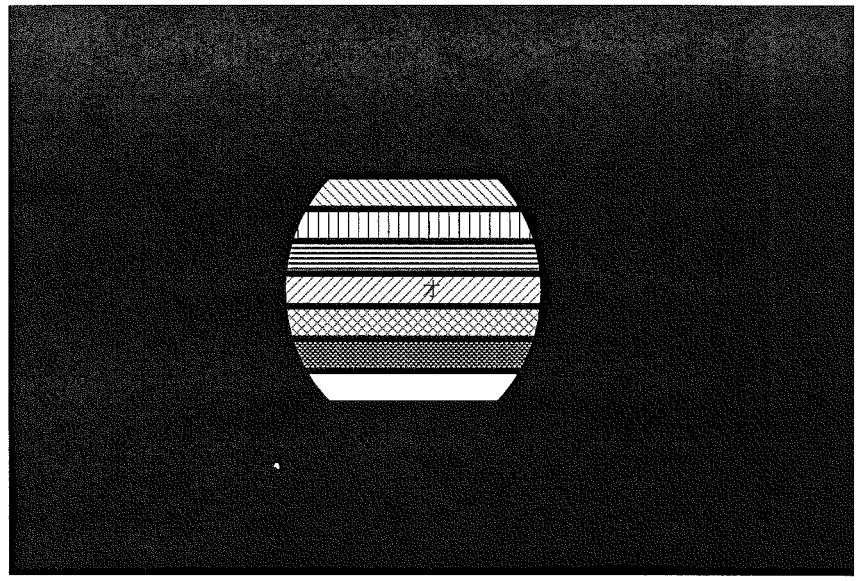
FIG. 16 is a schematic diagram of an image from the visible light signals according to an embodiment of the present invention.

According to some embodiments of the present invention, the image obtained from the visible light signals may be an image containing a pattern of color stripes. For example, for the light sources containing red (R), green (G) or blue (B) components, the image may contain a pattern of color stripes (red, green, yellow, blue, pink, cyan, white, black) where different colors represent different codes of the information transmitted as shown in FIG. 16.

According to some embodiments of the present invention, the step 210 may comprise obtaining the image by an image capturing device comprising an image sensor whose exposure mode is rolling shutter mode, and a sampling rate of the rolling shutter is higher than the frame rate of the image sensor. The image capturing device is used for capturing an image obtained from the visible light signal emitted by the light source. The image capturing device may be a smartphone, laptop computer, or other electronic device equipped with camera(s). Alternatively, the image capturing device may be an embedded system integrated in other devices or objects, for example, piece jewelry, key, card, pen, etc. The image sensor may be a photosensitive component.

According to some embodiments of the present invention, for an image sensor whose exposure mode is rolling shutter mode, different parts of the image sensor, each row or each column, may be exposed at different time. The image sensor may obtain an image containing a pattern of color stripes, such as those shown in FIG. 3, when capturing an image of a rapidly changing light source driven by the modulated driving signals, such as those shown in FIG. 2. Alternatively, the image sensor may obtain an image containing a pattern of stripes with different brightness levels, such as those shown in FIG. 8, when capturing image of a rapidly changing light source driven by the modulated driving signals, such as those shown in FIG. 7.

According to some embodiments of the present invention, the sampling rate of the rolling shutter is higher than the frame rate of the image sensor, so as to obtain a clear image containing a pattern of stripes with each stripe being corresponding to each row. For example, for a frame rate of the image sensor of 30 Hz and a resolution of 640*480, time required for capturing one image is 1 s/30 Hz=0.033 s=33 ms, and time required for capturing each row is 33 ms/480=69 us. In order to obtain a clear image containing a pattern of stripes with each stripe being corresponding to each row, the exposure time of each is less than 69 us and the sampling rate is higher than 30 Hz.

According to some embodiments of the present invention, the step 210 may comprise capturing on an image sensor with a rolling shutter the image in which different portions of the image sensor are exposed at different time points. Optionally, the image sensor may be a complementary metal-oxide-semiconductor (CMOS) image sensor or a Charge-Coupled Device (CCD) image sensor.

As shown in FIG. 15, after the step 210 described hereinbefore, step 220 of the method 200 is performed, wherein a pattern of color stripes in the image obtained from the visible light signals is measured.

According to some embodiments of the present invention, the pattern of color stripes in the image obtained from the visible light signals may be measured by for example an image processor or a general purpose processor. After the image is projected onto the image sensor surface, the optical signals detected by the image sensor are converted into electrical signals by the image sensor. The analog electrical signals are converted into digital signals by an analog-to-digital-converter (ADC) of the image sensor or the processor. The processor is applied to further process the digital signals and generate a digital image, which may be displayed on a monitor. Optionally, a digital signal processing (DSP) module of the processor may be applied to further process the digital signals and generate a digital image.

As shown in FIG. 15, after the step 220 described hereinbefore, step 230 of the method 200 is performed, wherein the information corresponding to the pattern of the color stripes are obtained.

According to some embodiments of the present invention, the information corresponding to the pattern of the color stripes may be any type of information, for example, data such as text, picture, audio, and video data, the identifier (ID) of the light source, and other information.

According to some embodiments of the present invention, the color stripes in the image are derived from combination of the visible light signals having two or more wavelengths. According to embodiments of the present invention, the information corresponding to the pattern of the color stripes, optionally, derived from the combination of the visible light signals having two or more wavelengths may be decoded. By this way, the initial information carried on the visible light signals can be recovered.

As shown in FIG. 3, the image captured by an image sensor can be generated from three light sources respectively emitting visible lights with RGB colors, which are driven by the modulated driving signals. When decoding the information corresponding to the pattern of the color stripes, the analysis of the captured image is based on the measurements of these three colors. For example, the stripe A relates to the first signal, the brightness of the three color is 0%, 0%, 0%, respectively, and its decoded wave form corresponds to that in time interval 1 as shown in FIG. 2; the stripe B relates to the second signal, the brightness of the three color is 100%, 0%, 0%, respectively, and its decoded wave form corresponds to that in time interval 2 as shown in FIG. 2; the stripe C relates to the third signal, the brightness of the three color is 0%, 100%, 0%, respectively, and its decoded wave form corresponds to that in time interval 3 as shown in FIG. 2. Similarly, other stripes may be decoded to obtain the transmitted information.

As shown in FIG. 8, the image captured by an image sensor may be generated from a light source driven by the modulated driving signal by modulating the amplitude of the driving signal according to an embodiment of the present invention. When decoding the information corresponding to the pattern of stripes, the analysis of the captured image is based on the measurement of the brightness. For example, the stripe A' relates to the first signal whose brightness is 0%, and its decoded wave form corresponds to that in time interval 1' as shown in FIG. 7; the stripe B' relates to the second signal whose brightness is 12.5%, and its decoded wave form corresponds to that in time interval 2' as shown in FIG. 7; the stripe C' relates to the third signal whose brightness is 25%, and its decoded wave form corresponds to that in time interval 3' as shown in FIG. 7. Similarly, other stripes may be decoded to obtain the transmitted information.

In the case where the image captured by an image sensor is generated from three light sources of three colors driven by the modulated driving signals modulated by modulating the frequencies as shown in FIG. 2, and at the same time the modulated driving signal for each light source is modulated by the amplitude as shown in FIG. 8, a pattern of 64 stripes with different colors and/or brightness may be obtained in the image captured by the image sensor. When decoding the information corresponding to the pattern of 64 stripes, the analysis of the captured image may be based on the measurement of the three colors and brightness as mentioned above.

According to embodiments of the present invention, the light sources may be one or more sets of light sources. The image obtained may have one or more exposed regions, and each exposed region may contain a pattern of stripes corresponding to one set of light sources.

Figure 17:
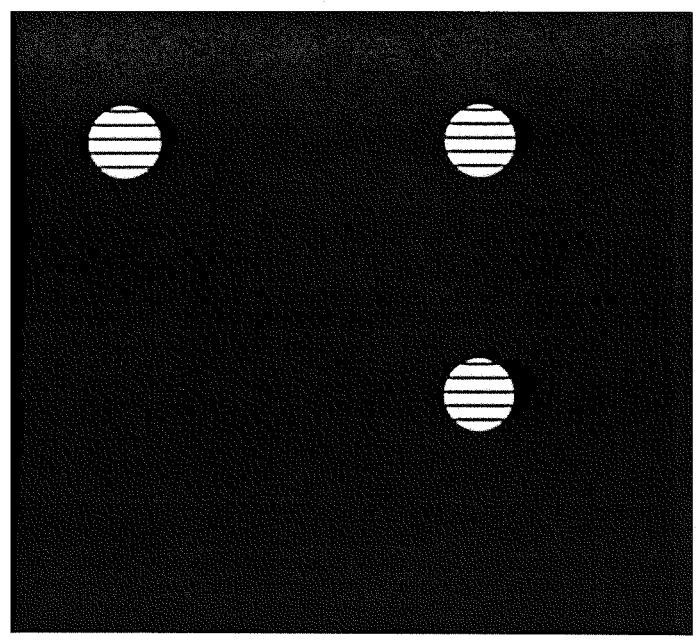
FIG. 17 is a schematic diagram of an image containing one or more exposed regions corresponding to one or more sets of light sources according to an embodiment of the present invention.

FIG. 17 is a schematic diagram of an image containing one or more exposed regions corresponding to one or more sets of light sources according to an embodiment of the present invention. In FIG. 17, the image obtained has three exposed regions, and each exposed region contains a pattern of stripes as shown in FIG. 16, corresponding to one set of light sources with three colors driven by the modulated driving signals as shown in FIG. 2.

The step 210 may comprise: obtaining the image from the visible light signals having their levels changed between peak levels and bottom levels with different frequencies and/or different phases and/or different amplitudes emitted by the one or more sets of light sources, wherein one or more exposed regions in the image correspond to the one or more sets of light sources. The image having one or more exposed regions obtained from one or more sets of light sources, for example the image shown in FIG. 17, may be obtained in the similar way as that obtained from one set of light sources as mention above, which will not be iterated herein for the sake of conciseness. Further, the step 220 may comprise measuring patterns of the color stripes of the one or more exposed regions in the image. The pattern of the color stripes of each exposed region corresponding to each set of light sources may be measured in the similar way as mentioned above. For example, the pattern of the color stripes of each exposed region corresponding to each set of light sources with three colors shown in FIG. 17 may be respectively measured in the similar way as the pattern shown in FIG. 16, which will not be iterated herein for the sake of conciseness. Still further, the step 230 may comprise obtaining the information corresponding to the patterns of the color stripes of the one or more exposed regions in the image. The information corresponding to the pattern of the color stripes of each exposed regions in the image may be obtained respectively, in the similar way as that from one set of light sources as mention above. For example, information corresponding to the pattern of the color stripes of each exposed region corresponding to each set of light sources with three colors shown in FIG. 17 may be respectively obtained in the similar way as that corresponding to the pattern shown in FIG. 16, which will not be iterated herein for the sake of conciseness.

When the incident light is not in perpendicular with the plane of the image sensor, the shape of the light spot projected on the image sensor may have distortion, for example, from a circular to an ellipse. In this case, acceleration meter, gravity sensor, tilt sensor, gyro, or magnetic sensor may be applied to measure the angle of inclination, which may be used to obtain the information corresponding to the patterns of the color stripes of the one or more exposed regions in the image.

Figure 18:
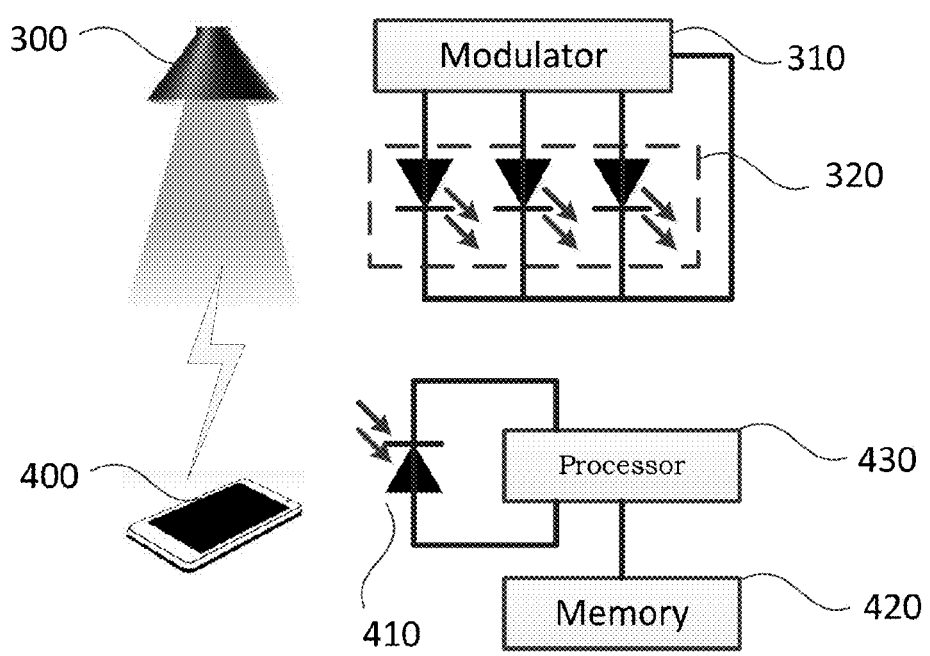
FIG. 18 is a schematic diagram of an image containing one or more exposed regions corresponding to one or more sets of light sources according to an embodiment of the present invention.

According to a third aspect of the present invention, there is provided a light source 300 for transmitting information by visible light signals of two or more wavelengths. As shown in FIG. 18, the light source 300 may be a lamp, for example a LED lamp, LED backlight, LED flat light, etc. However, the light source 300 is not limited to the above example, but may be any light source capable of transmitting visible light signals.

As shown in FIG. 18, the light source 300 may comprise a modulator 310 and an emitter 320. The modulator 310 may be a modulator driven by an electric signal with constant current, constant voltage, constant electric power, constant optical power, or by an electric signal modulated by PWM. The emitter 320 may be a LED which may emit visible light signals with different colors depending on different wavelengths of the emitted visible light signals, such as red light having wavelength of 640-780 nm, green light having wavelength of 505-525 nm, blue light having wavelength of 470-505 nm. As for one-way LED driving, the emitter 320 may be one or more LEDs connected in one string, including 1 to dozens of LEDs. Alternatively, the emitter 320 may be one or more LEDs connected in more strings with each string including 1 to dozens of LEDs. According to embodiments of the present invention, the emitter 320 comprises more LEDs. However, the modulator 310 or the emitter 320 is not limited to the above example, but may be any modulator or emitter.

The modulator 310 can be configured to modulate, on the basis of the information to be transmitted, two or more driving signals of the light source to obtain two or more modulated driving signals for driving the light source to emit the visible light signals of two or more wavelengths having their levels changed between peak levels and bottom levels with different frequencies and/or different phases and/or different amplitudes.

The emitter 320 can be configured to emit the visible light signals of two or more wavelengths having their levels changed between peak levels and bottom levels with different frequencies and/or different phases and/or different amplitudes on the basis of the two or more modulated driving signals, so as to transmit information corresponding to a pattern of color stripes shown in an image obtained from the visible light signals.

According to some embodiments of the present invention, the modulator 310 can be configured to modulate, on the basis of the information to be transmitted, two or more driving voltages or two or more driving currents of the light source to obtain a first set of modulated driving voltages or a first set of modulated driving currents.

According to some embodiments of the present invention, the first set of modulated driving currents are respectively greater than un-modulated driving currents, so that luminous flux of the light source driven by the first set of modulated driving currents is equal to luminous flux of light source driven by the un-modulated driving currents.

According to some embodiments of the present invention, the emitter 320 can be configured to emit the visible light signals on the basis of a second set of modulated driving currents which are greater than un-modulated driving currents together with a high frequency carrier wave signal, so that luminous flux of the light sources driven by the second set of modulated driving currents is constant among periods comprising peak levels and bottom levels.

According to some embodiments of the present invention, the information corresponding to the pattern of color stripes comprises data bits, which comprise data corresponding to the number, color, brightness, or arranging order of the color stripes.

According to some embodiments of the present invention, the information corresponding to the pattern of color stripes further comprises one or more start bits and/or one or more error correction bits, the start bits being used to identify a start position of a set of data bits, and the error correction bits being used to check error in the data bits.

According to some embodiments of the present invention, the modulator 310 can be configured to modulate the frequencies and/or phases and/or amplitudes of the two or more driving signals to obtain two or more modulated driving signals.

According to some embodiments of the present invention, the color stripes in the image are derived from combination of the visible light signals having two or more wavelengths.

The above detailed descriptions for the method 100 also apply to the embodiments of the light source 300 according to the present invention, and are thus not iterated for the sake of conciseness. In particular, the step 110 in the method 100 can be performed by the modulator 310, and the step 120 in the method 100 can be performed by the emitter 320.

According to a fourth aspect of the present invention, there is provided a device 400 for obtaining information from visible light signals of two or more wavelengths from light sources. For example, the device may be a mobile device with a camera, such as a smartphone, tablet, laptop computer, or other electronic device. However, the device 400 is not limited to these examples, but can be any electronic device with photosensitive component.

As shown in FIG. 18, the device 400 for obtaining information from visible light signals may comprises an image sensor 410, a memory 420, and a processor 430. The image sensor 410 may be for example a camera, photodiode, and photodiode array. The memory 420 may be for example volatile memory, non-volatile memory, etc. The processor 430 may be general purpose processor, dedicated processor, etc.

The image sensor 410 can be configured to obtain an image from the visible light signals of two or more wavelengths having their levels changed between peak levels and bottom levels with different frequencies and/or different phases and/or different amplitudes emitted by the light sources. The memory 420 can be configured to store the image obtained by the image sensor. The processor 430 can be configured to measure a pattern of color stripes in the image stored in the memory and obtain information corresponding to the pattern of the color stripes.

According to some embodiments of the present invention, exposure mode of the image sensor is rolling shutter mode, and a sampling rate of the rolling shutter is higher than the frame rate of the image sensor.

According to some embodiments of the present invention, the image sensor 410 is an image sensor with a rolling shutter and is configured to obtain the image from the visible light signals in which different portions of the image sensor are exposed at different time points. Optionally, the image sensor 410 may be a complementary metal-oxide-semiconductor (CMOS) image sensor or a Charge-Coupled Device (CCD) image sensor.

According to some embodiments of the present invention, the visible light signals are emitted by the light sources 300 on the basis of the modulated driving signals, which drive the light sources to emit the visible light signals having their levels changed between peak levels and bottom levels with different frequencies and/or different phases and/or different amplitudes.

According to some embodiments of the present invention, the light sources 300 may be one or more sets of light sources, and the image sensor 410 can be configured to obtain the image from the visible light signals having their levels changed between peak levels and bottom levels with different frequencies and/or different phases and/or different amplitudes emitted by the one or more sets of light sources, wherein one or more exposed regions in the image correspond to the one or more sets of light sources; the memory 420 can be configured to store the image obtained by the image sensor; and the processor 430 can be configured to measure patterns of the color stripes of the one or more exposed regions in the image, and obtain information corresponding to the patterns of the color stripes of the one or more exposed regions in the image.

According to some embodiments of the present invention, the color stripes in the image are derived from combination of the visible light signals having two or more wavelengths.

The above detailed descriptions for the method 200 also apply to the embodiments of the device 400 according to the present invention, and are thus not iterated for the sake of conciseness. In particular, the step 210 in the method 200 as described above can be performed by the image sensor 410, and the steps 220 and 230 in the method 200 can be performed by the processor 430.

Figure 19:
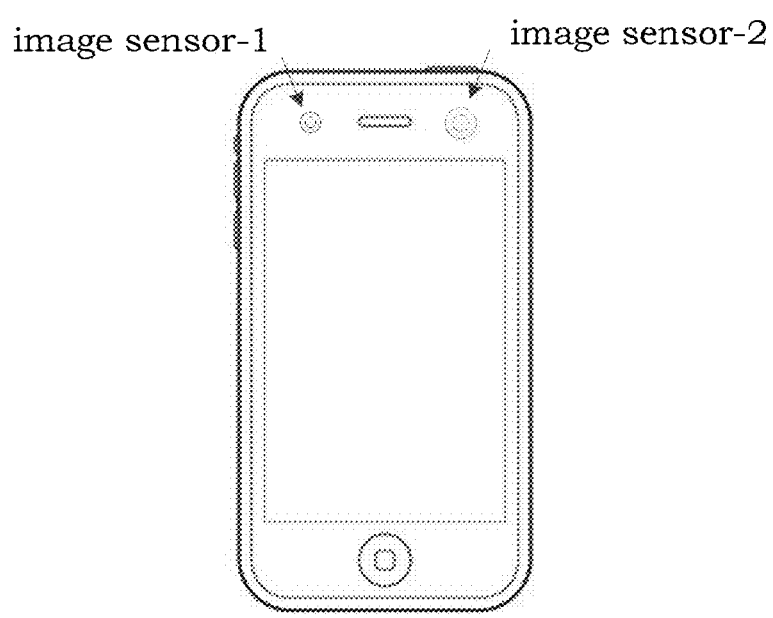
FIG. 19 is a schematic diagram of a device containing multiple image sensors according to an embodiment of the present invention.

According to some embodiments of the present invention, the device 400 may contain multiple image sensors as shown in FIG. 19. When using multiple image sensors in the device, it is necessary to pre-determine which image sensor is activated. Optionally, the strategy may be as follows: activating all image sensors; choosing the image sensor which receives the light signals first as an activated image sensor, and switching off other image sensors. Optionally, the strategy may be manually choosing one image sensor as an activated image sensor. Optionally, the strategy may be choosing one image sensor as an activated image sensor based on the information collected by other image sensors or processors to obtain the information corresponding to the patterns of the color stripes of the one or more exposed regions in the image.

Figure 20A:
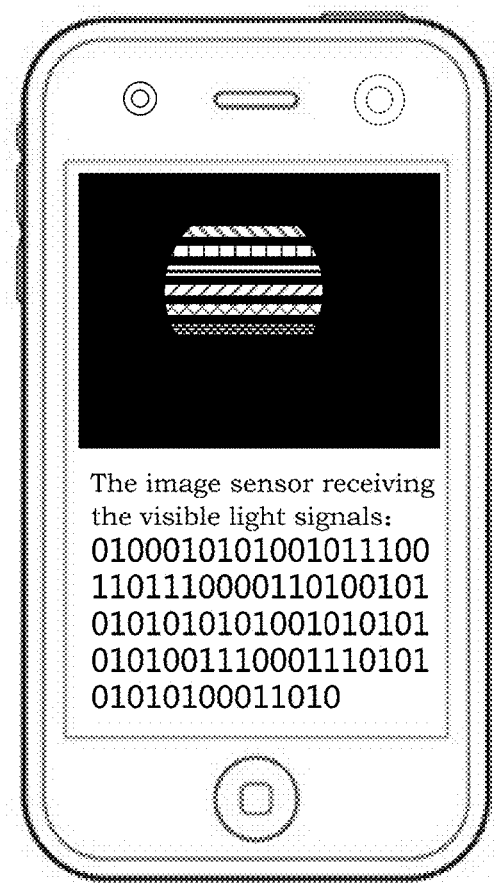
FIG. 20A is a schematic diagram of an interface with the real-time image and the information obtained therefrom displayed in full screen according to an embodiment of the present invention.
Figure 20B:
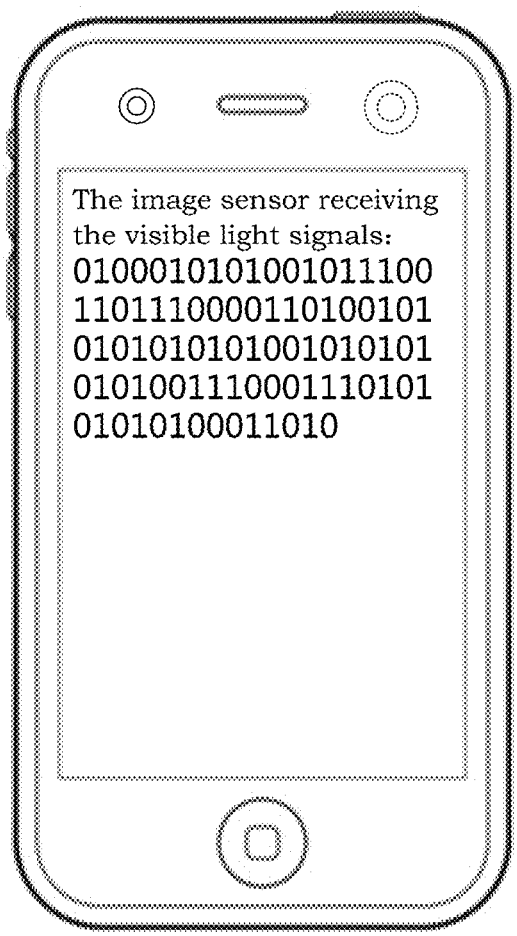
FIG. 20B is a schematic diagram of an interface with the information obtained from the image displayed according to an embodiment of the present invention.

According to some embodiments of the present invention, a software program may be used to trigger the image sensor in the device for obtaining information from visible light signals to start receiving the visible light signal. Optionally, the real-time image and the information obtained therefrom may be displayed in the program during the process of capturing image, as shown in FIG. 20A. Optionally, only the information obtained from the image may be displayed in the program during the process of capturing image, as shown in FIG. 20B.

Figure 21:
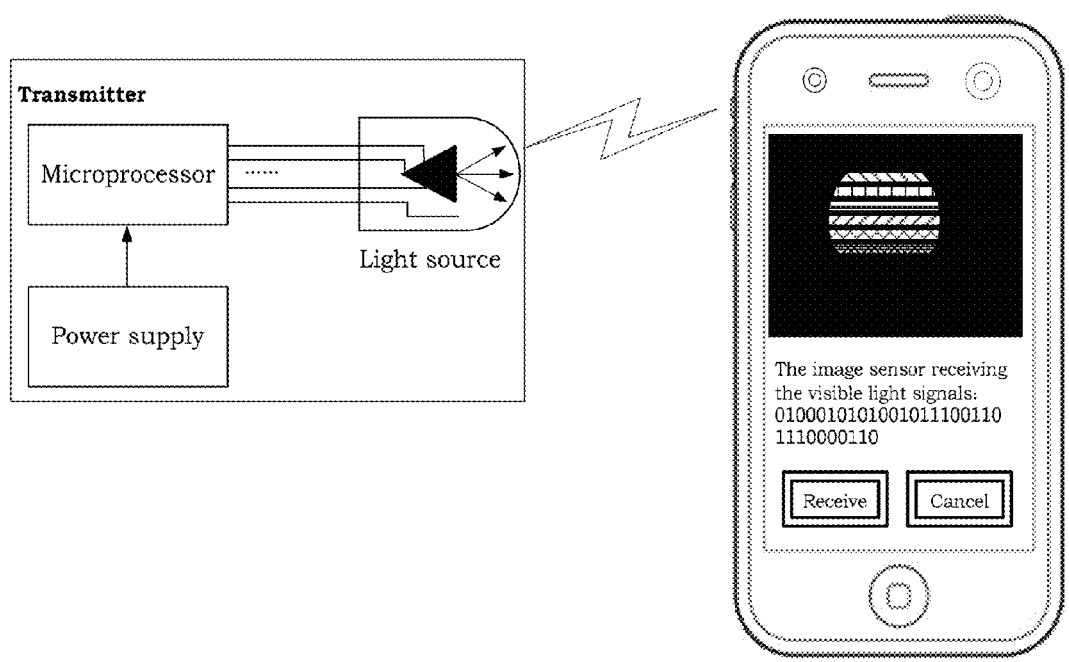
FIG. 21 is a schematic diagram showing an embodiment of the present invention with a device for obtaining information from visible light signals comprising an image sensor activated by an activation signal sent by the transmitter.

According to some embodiments of the present invention, a light source for transmitting information by visible light signals of two or more wavelengths comprising a modulator and an emitter according to the present invention may be included in a transmitter as shown in FIG. 21. The transmitter may further comprise a power supply, and a microprocessor, e.g., a micro controller unit (MCU). Before the visible light signals are ready to be emitted by the transmitter, the image sensor should be activated in advance. Optionally, the image sensor may be activated by an activation signal sent by the transmitter, as shown in FIG. 21. The activation may be realized by a software-based switch. When this switch is turned on, the image sensor starts receiving the visible light signals. Alternatively, the image sensor may be activated by other manners. For instance, when the software begins to operate, the image sensor is activated at the same time. Optionally, the activation can also be achieved by other switches, sensors or network.

Figure 22:
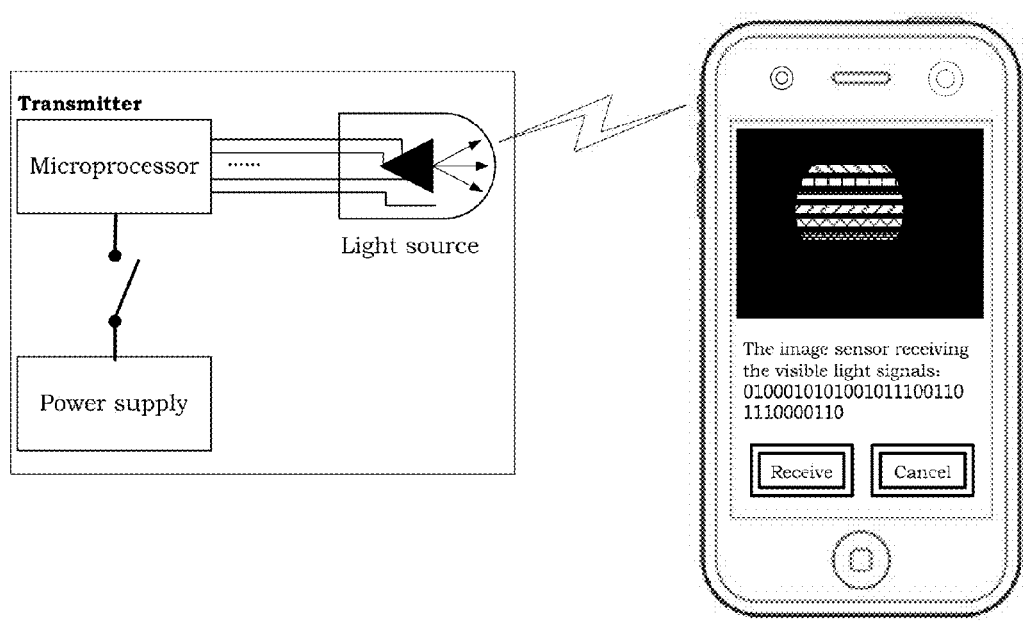
FIG. 22 is a schematic diagram showing an embodiment of the present invention with a hardware-based switch installed on the transmitter for activating the image sensor in the device for obtaining information from visible light signals.

According to some embodiments of the present invention, when the image sensor is activated to receive the visible light signals, the transmitter is informed to send the visible light signals. This can be realized by a hardware-based switch installed on the transmitter, as shown in FIG. 22. When this switch is turned, the transmitter starts to send the visible light signals; when the switch is turned off, the transmitter stops sending the visible light signals. Alternatively, the transmitter may be informed by other manners, such as, buttons, physical contact, sensors, and network.

Figure 23:
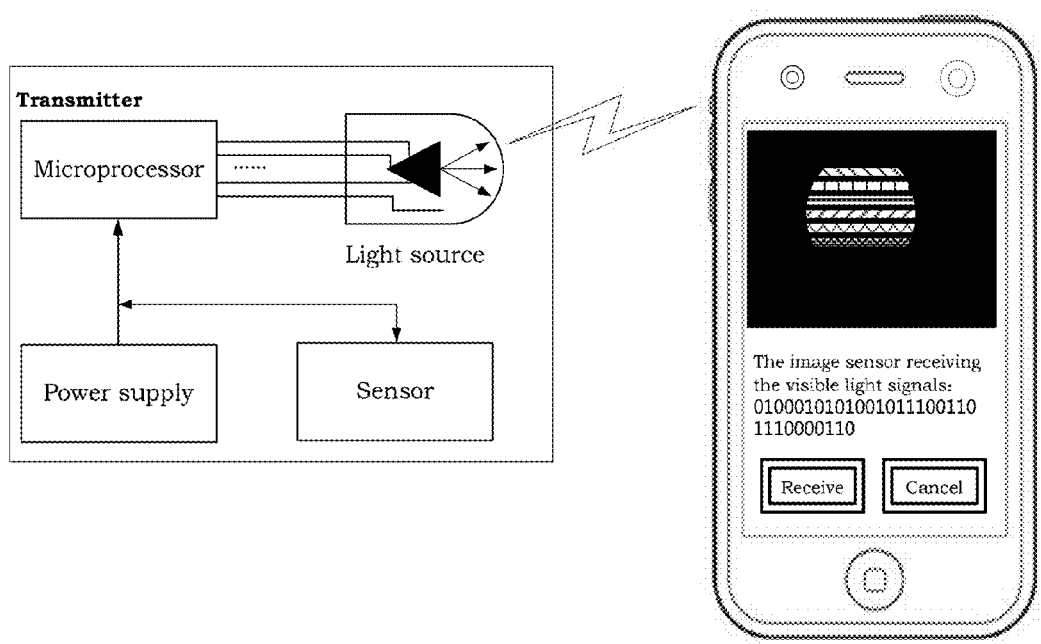
FIG. 23 is a schematic diagram showing an embodiment of the present invention with a sensor integrated in the emitter.

According to some embodiments of the present invention, a photosensitive device may be integrated in the transmitter to detect the state of the image sensor, such as whether the image sensor is ready to capture images. Before the transmitter sends the visible light signals, the photosensitive device may first check the state of the image sensor. Optionally, when the image sensor is ready to capture images, the light emitting component of the image sensor changes the brightness at a certain frequency, and such changes of the brightness can be detected by the photosensitive device integrated in the transmitter; and then the transmitter starts to send the visible light signals, as shown in FIG. 23. Alternatively, the state of the image sensor may be detected by other sensors, such as, sound sensor, gravity sensor, acceleration meter, etc. Alternatively, the state of the image sensor may be detected by other manners, such as, network adaptors, for example GPRS, GSM, CDMA, WiFi, Zigbee, Bluetooth, RFID, etc.

Figure 24:
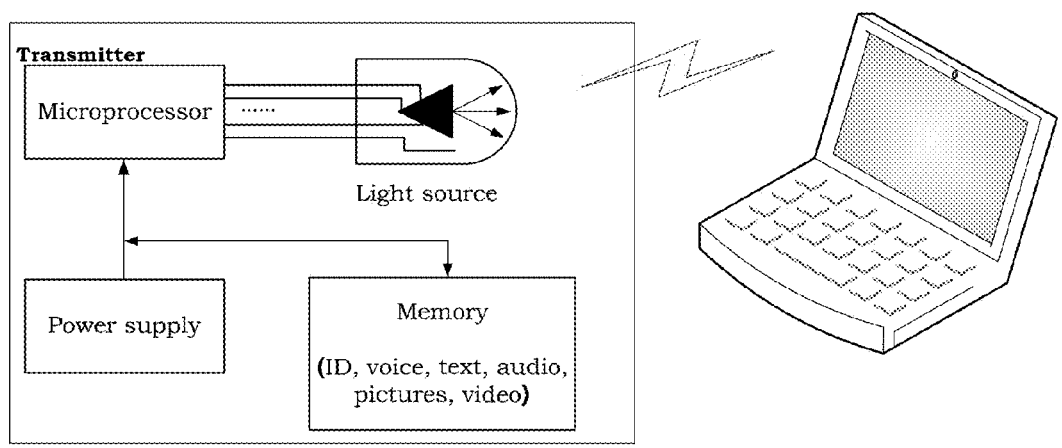
FIG. 24 is a schematic diagram showing an embodiment of the present invention with a transmitter for transmitting multiple types of information.

According to some embodiments of the present invention, the transmitter may transmit multiple types of information, comprising but not limited to, identifier (ID) of the transmitter, voice, text, audio, pictures, video, etc., which may be stored in the memory, as shown in FIG. 24.

Figure 25:
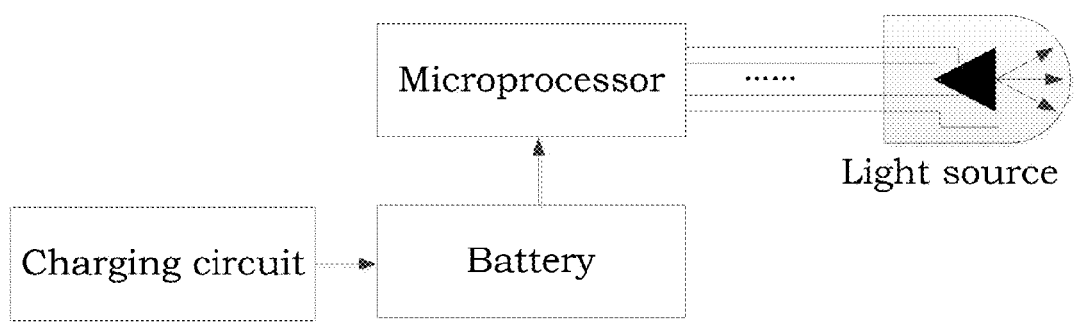
FIG. 25 is a schematic diagram showing an embodiment of the present invention with a transmitter comprising a light source, a processor, a battery, and a charging circuit.

According to some embodiments of the present invention, the transmitter may comprise a light source according to the present invention, a microprocessor (for example a MCU), and a battery, as shown in FIG. 25. The microprocessor encodes the driving current/voltage of the light source, a modulator in the light source may modulate the driving current/voltage of the light source on the basis of the information to be transmitted, and an emitter in the light source may emit the visible light signals on the basis of the modulated driving current/voltage. The light source may be two or more light sources emitting visible light signals of with two or more different wavelengths (colors). The battery may be used to provide energy for the light source and the microprocessor. Optionally, as shown in FIG. 25, the transmitter may further comprise a charging circuit applied for charging the battery or protecting the battery from being overcharged or overheated, etc.

Figure 26:
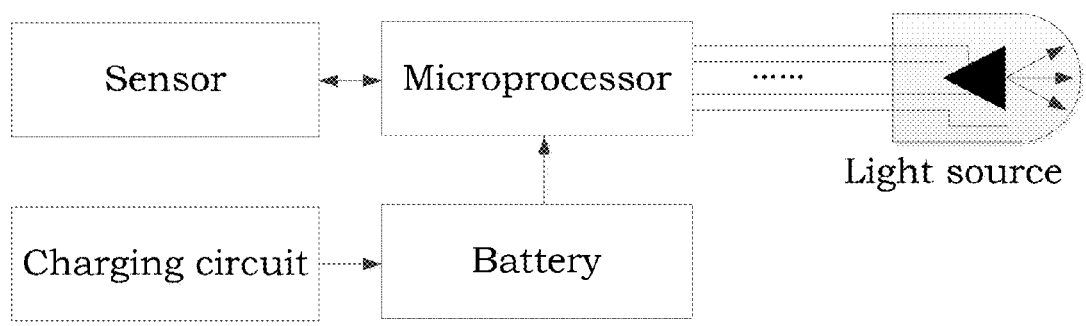
FIG. 26 is a schematic diagram showing an embodiment of the present invention with a transmitter comprising a light source, a processor, a battery, a charging circuit, and a sensor.

According to some embodiments of the present invention, the transmitter may further comprise a sensor as shown in FIG. 26. The sensor may be applied for measuring electrical parameters, such as temperature, humidity, voltage, and current, or biological parameters, such as human heart rate, body temperature, and blood pressure.

Figure 27:
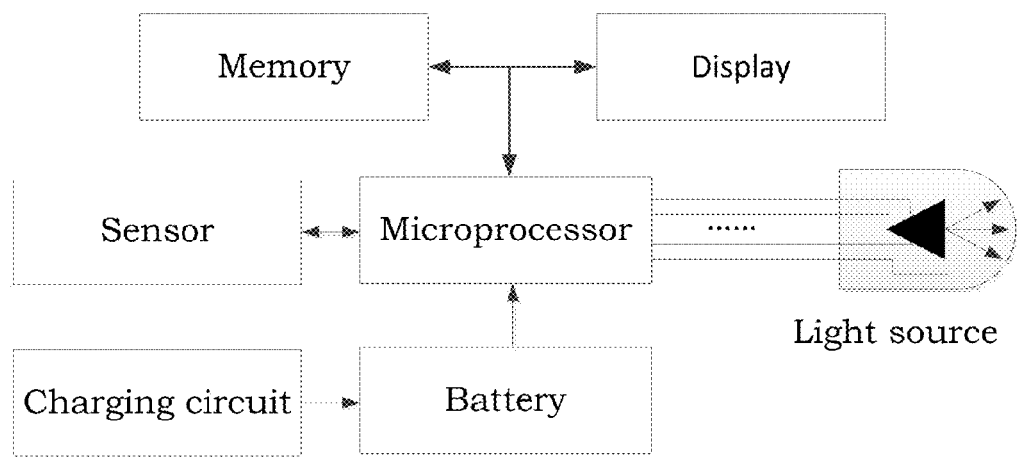
FIG. 27 is a schematic diagram showing an embodiment of the present invention with a transmitter comprising a light source, a processor, a battery, a charging circuit, a sensor, and a memory.

According to some embodiments of the present invention, the transmitter may further comprise a memory as shown in FIG. 27. The memory is applied for storing information, such as pre-stored data, and information collected by sensors.

According to some embodiments of the present invention, the transmitter may further comprise a display as shown in FIG. 27. The display is applied for showing the transmitted information.

Figure 28:
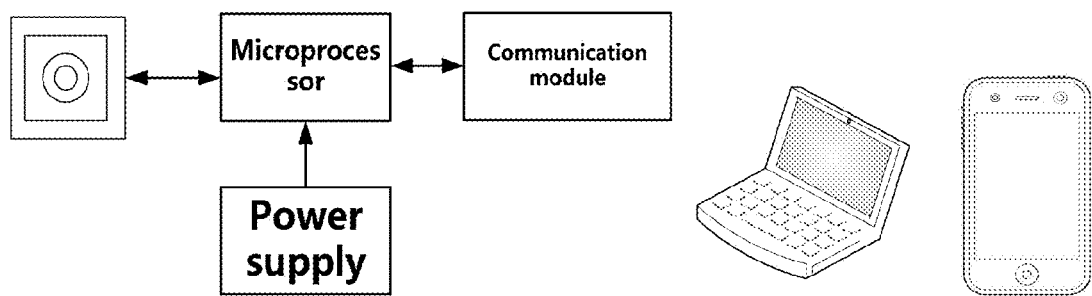
FIG. 28 is a schematic diagram of the device for obtaining information according to an embodiment of the present invention.

According to some embodiments of the present invention, the device for obtaining information may comprise an image sensor, a microprocessor (for example a MCU) and a power supply, as shown in FIG. 28. The image sensor is applied for capturing the visible light signals mitted by the light source. The processor is applied for measuring the pattern of color strips contained in the captured image and obtaining information corresponding to the pattern of color strips. The power supply is used to provide energy for the processor.

According to some embodiments of the present invention, the device for obtaining information from visible light signals of two or more wavelengths from light sources may further comprise a communication module, as shown in FIG. 28. The communication module may be wired or wireless, and may be applied for data transmission between the device and other electronic devices, or connecting the device to Internet.

Figure 29:
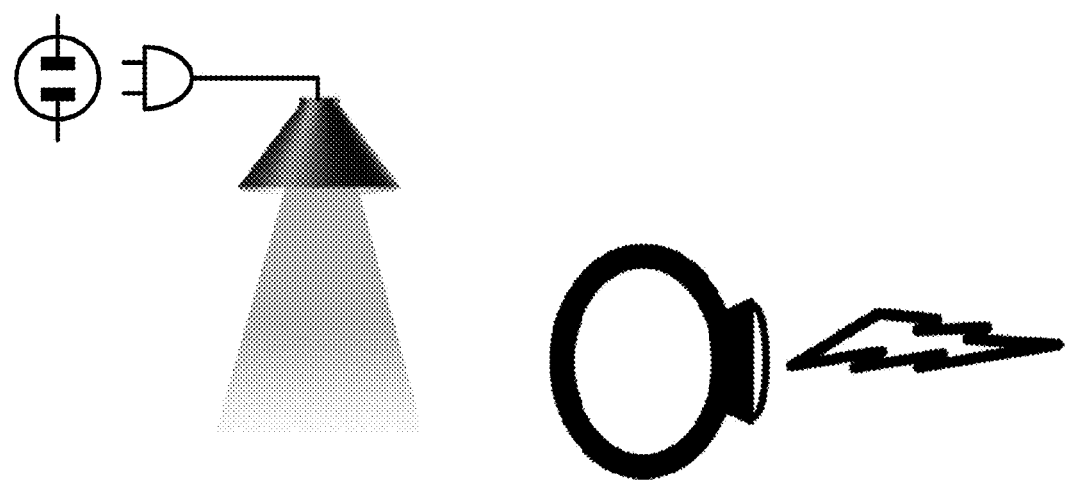
FIG. 29 is a schematic diagram showing an embodiment of the present invention with an image sensor integrated in a ring.

According to some embodiments of the present invention, the transmitter could be a lamp comprising multiple color light sources. The transmitter may be an embedded system integrated in other devices, such as an integrated part of a ring, as shown in FIG. 29.

According to some embodiments of the present invention, the basic working principle of the system for transmitting and obtaining information by visible light signals comprising a light source for transmitting information by visible light signals of two or more wavelengths and a device for obtaining information from visible light signals of two or more wavelengths from light sources according to embodiments of the present invention is as follows: the image sensor in the device captures the visible light signals emitted by the light source and obtain an image therefrom, and the processor in the device measures a pattern of color stripes contained in the image and recovers the information corresponding to the pattern of color strips.

According to some embodiments of the present invention, the transmitter may be integrated in a wearable electronic device, providing advantages of small in volume, easy to carry, and low in power consumption. The wearable electronic device may be a jewelry, such as a ring, an earrings, a necklace, a watches, etc., or maybe a key, a card, a pen, etc. When the transmitter is integrated in the wearable electronic device, such wearable electronic device can emit visible light signals for transmitting information.

Figure 30:
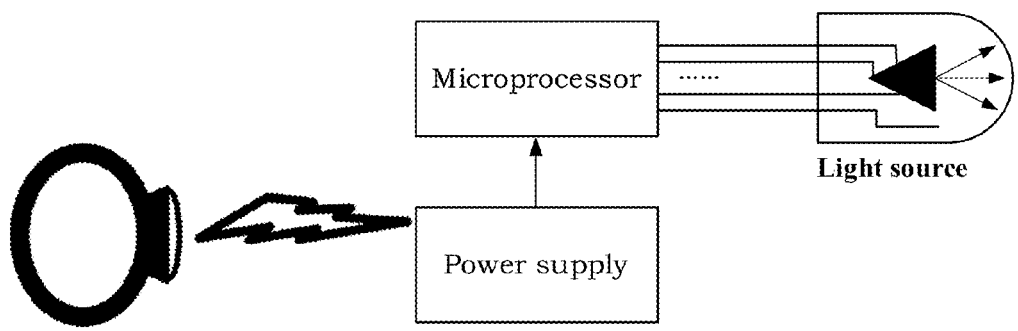
FIG. 30 is a schematic diagram showing an embodiment of the present invention with a transmitter integrated in a wearable electronic device powered by a power supply.

According to some embodiments of the present invention, the transmitter may be integrated in a wearable electronic device, such as a ring powered by a battery, as shown in FIG. 30. It should be noted that the ring is only used for illustrating the present invention, but should not be considered as the limitation to the present invention. The battery is used to provide energy for the transmitter. The light source included in the transmitter can emit visible light of two or more different wavelengths (colors) and each light source may be modulated independently.

Figure 31:
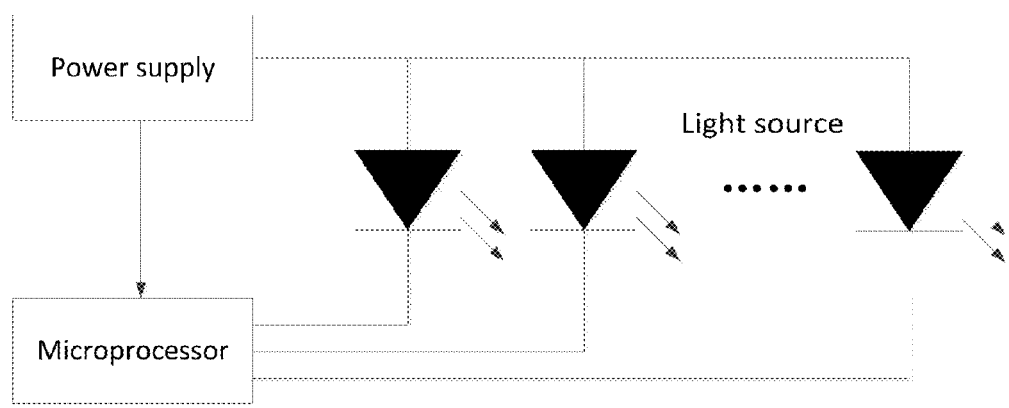
FIG. 31 is a schematic diagram of a transmitter comprising two or more light sources and a microprocessor according to an embodiment of the present invention.

According to some embodiments of the present invention, the transmitter may comprise two or more light sources that can emit visible light signals of two or more wavelengths (colors), e.g., color 1, color 2, . . . and color n, as shown in FIG. 31. Each color or their combination represents a unique data code. As described before, the transmitter may be integrated in a wearable electronic device.

Figure 32:
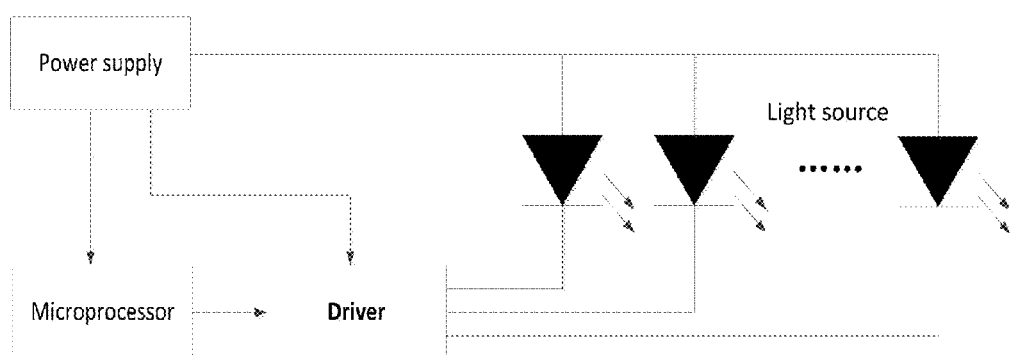
FIG. 32 is a schematic diagram of a transmitter comprising two or more light sources, a microprocessor, and a driver according to an embodiment of the present invention.

According to some embodiments of the present invention, the transmitter may further comprise a driver, as shown in FIG. 32. As described before, the transmitter may be integrated in a wearable electronic device. The driver is added to drive the light source. The driver can supply larger driving current or driving voltage to drive high-power light sources. In this way, the transmission distance of transmitter can be increased.

Figure 33:
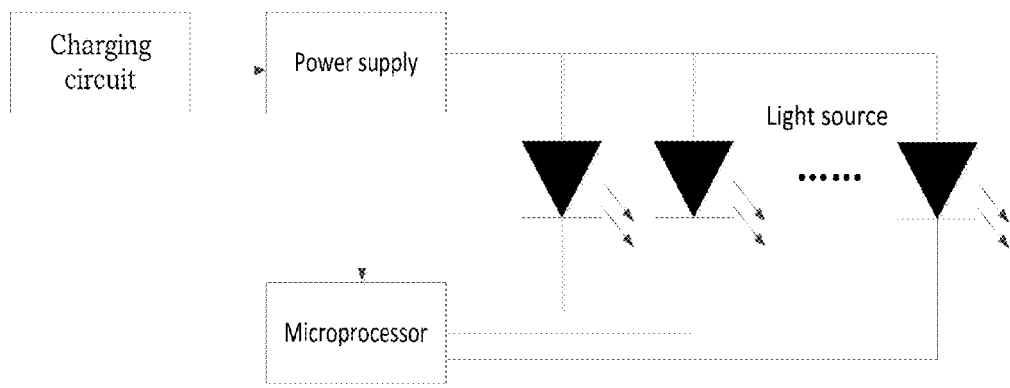
FIG. 33 is a schematic diagram of a transmitter comprising a microprocessor and a battery charging circuit according to an embodiment of the present invention.

According to some embodiments of the present invention, the transmitter may further comprise a battery charging circuit, as shown in FIG. 33. As described before, the transmitter may be integrated in a wearable electronic device. The charging circuit is applied not only for charging the battery, but also for limiting the charging current/voltage or checking the temperature, etc., so as to protect the battery from being overcharged or overheated. Optionally, the charging circuit can be powered by an external power source, such as power mains, solar panel, generator, or energy harvesting system, etc. Optionally, the charging circuit can be a wireless charging system.

Figure 34:
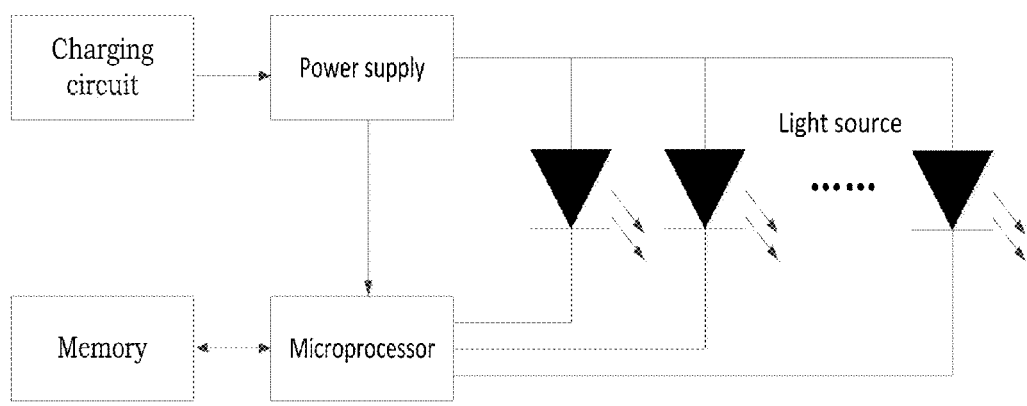
FIG. 34 is a schematic diagram of a transmitter comprising a microprocessor, a battery charging circuit, and a memory according to an embodiment of the present invention.

According to some embodiments of the present invention, the transmitter may further comprise a memory as shown in FIG. 34. As described before, the transmitter may be integrated in a wearable electronic device. The memory is applied for storing information, such as pre-stored data, and the information collected by the image sensor.

Figure 35:
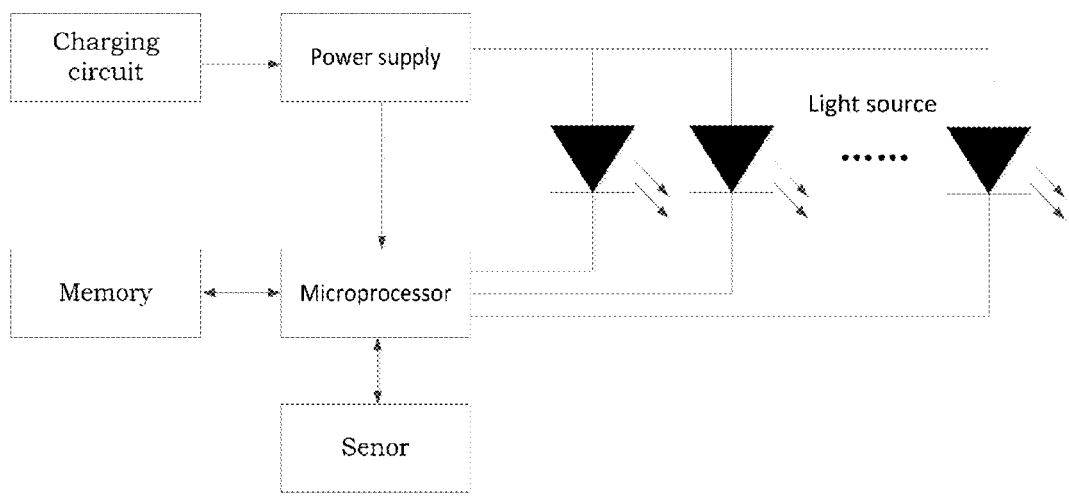
FIG. 35 is a schematic diagram of a transmitter comprising a microprocessor, a battery charging circuit, a memory, and a sensor according to an embodiment of the present invention.

According to some embodiments of the present invention, the transmitter may further comprise a sensor as shown in FIG. 35. As described before, the transmitter may be integrated in a wearable electronic device. The sensor may be applied for measuring parameters, such as temperature, humidity, voltage and current, or biological parameters, such as human heart rate, body temperature and blood pressure. Such sensor could be a temperature sensor, humidity sensor, optical sensor, sound sensor, accelerometer, pressure sensor, etc. The transmitter may also comprise a voltage/current sensing circuit, which is applied for detecting the state of the battery. If a low battery is detected, the transmitter may inform the user by signal of light, sound, vibration, etc.

Figure 36:
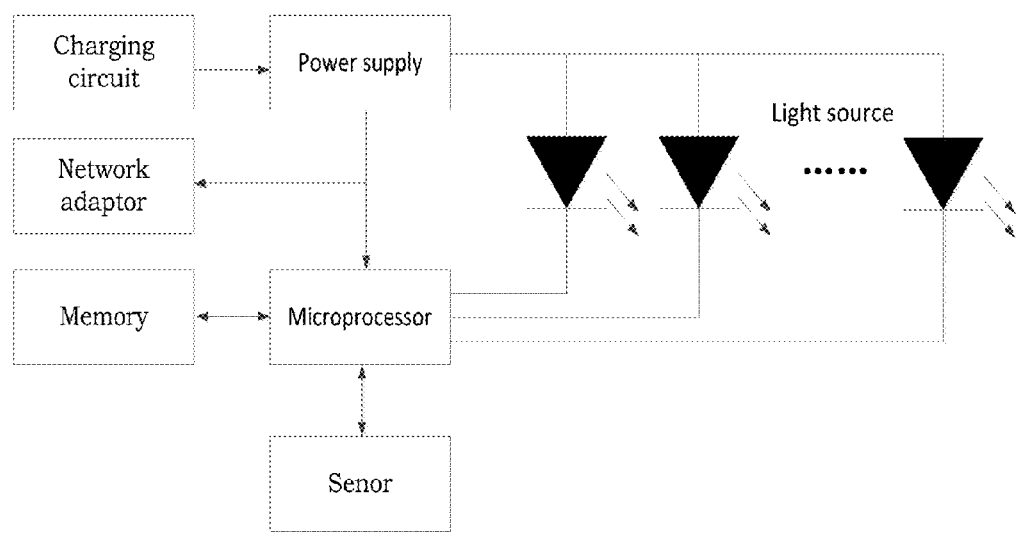
FIG. 36 is a schematic diagram of a transmitter comprising a microprocessor, a battery charging circuit, a memory, a sensor, and a network adaptor according to an embodiment of the present invention.

According to some embodiments of the present invention, the transmitter may further comprise a network adaptor as shown in FIG. 36. As described before, the transmitter may be integrated in a wearable electronic device. The network adapter is applied for data exchange between the device for obtaining information from visible light signals and other electronic devices with network capability, e.g., a computer; or sending commands to control other devices. Optionally, the network adapter may use following communication technologies: GPRS, GSM, CDMA, WiFi, Zigbee, Bluetooth, RFID, etc.

Figure 37:
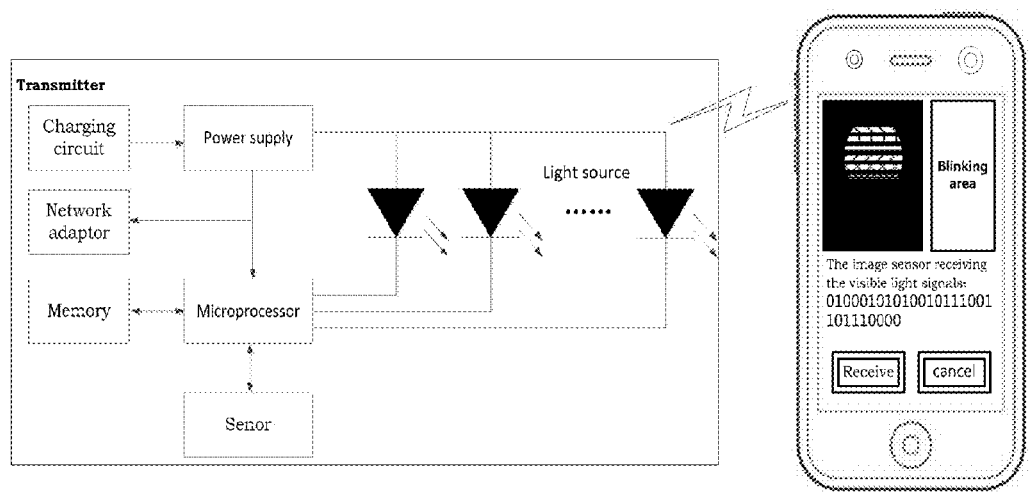
FIG. 37 is a schematic diagram illustrating communication between a transmitter and a device for obtaining information from visible light signals comprising an image sensor according to an embodiment of the present invention.

According to some embodiments of the present invention, before the transmitter sends the visible light signals, the transmitter may first check the state of the image sensor in the device for obtaining information from visible light signals. Optionally, when the image sensor is ready to capture images, the screen of the light emitting component changes the brightness at a certain frequency, and such changes of the brightness can be detected by the photosensitive device (e.g., a sensor) integrated in the transmitter; and then the transmitter starts to send the visible light signals, as shown in FIG. 37. Optionally, when the device for obtaining information from is a smartphone, a LED flashlight embedded in the smartphone may be used to send signals to the transmitter. Alternatively, the state of the device for obtaining information from visible light signals may be detected by other sensors, such as, sound sensor, gravity sensor, acceleration meter, etc. Alternatively, the state of the device for obtaining information from visible light signals may be detected by other manners, such as, network adaptors, for example GPRS, GSM, CDMA, WiFi, Zigbee, Bluetooth, RFID, etc. Alternatively, the device for obtaining information from visible light signals may be a laptop computer or other electronic devices which have photosensitive component(s).

Figure 38:
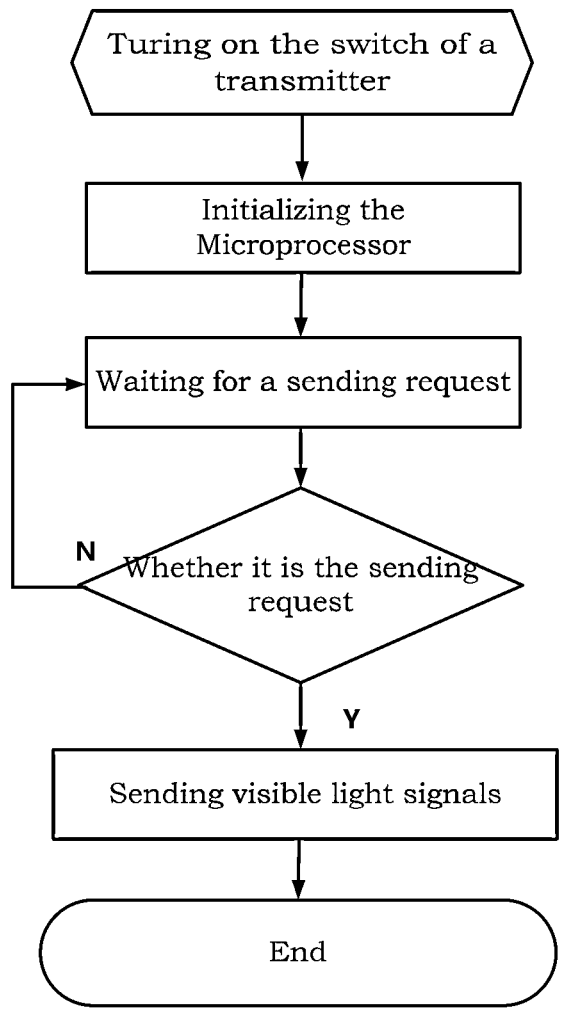
FIG. 38 is a flowchart of a process that a transmitter sends visible light signals according to an embodiment of the present invention.

According to some embodiments of the present invention, the transmitter is integrated in a wearable electronic device. When the wearable electronic device starts to send the visible light signals, its transmitter should be turned on. This can be realized by a hardware-based switch installed on the transmitter, or other sensor-based switch connected to the transmitter. When the wearable electronic device receives the switch-on signal, it starts to send light signals. The above described process is illustrated in FIG. 38.

Figure 39:
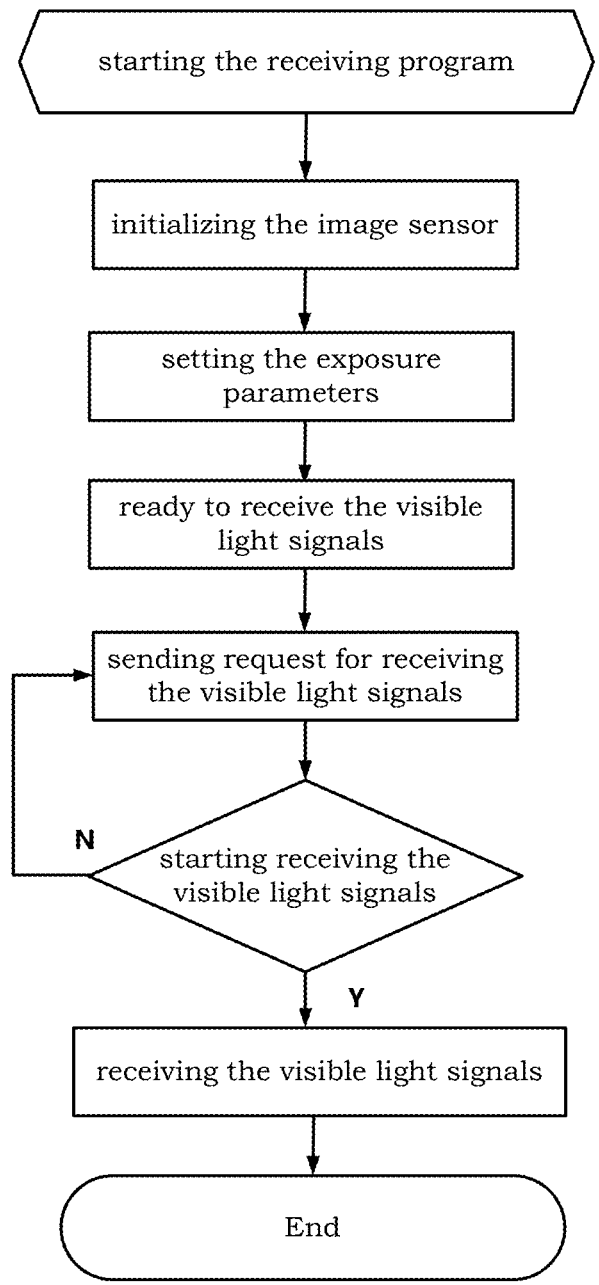
FIG. 39 is a flowchart of a process that an image sensor receives the visible light signals according to an embodiment of the present invention.

According to some embodiments of the present invention, after a transmitter starts to send the visible light signals, the working flow of the image sensor in the device for obtaining information from visible light signals is as follows, as shown in FIG. 39: starting the receiving program, initializing the image sensor, setting the exposure parameters, sending request for receiving the visible light signals and waiting for the visible light signals; after receiving the visible light signals, checking the start code, analyzing the captured images, measuring the pattern of stripes, and recovering the information.

Figure 40:
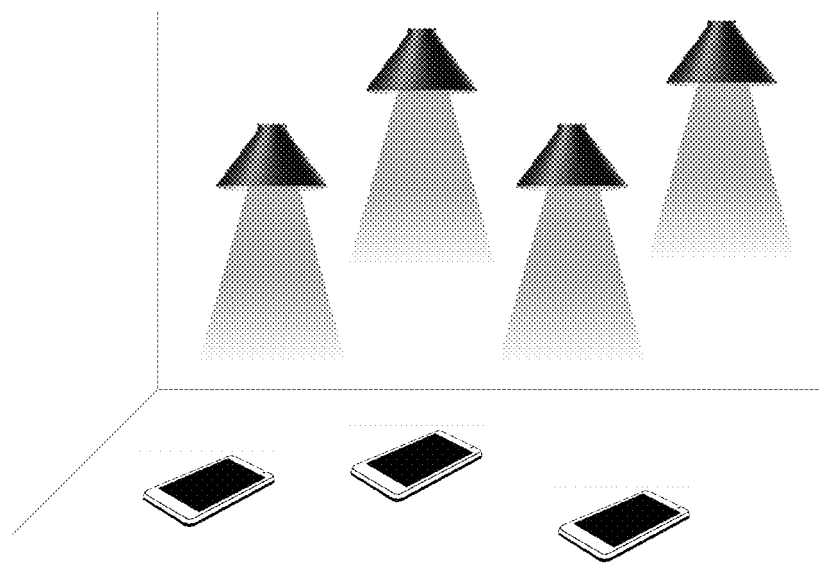
FIG. 40 is a schematic diagram of a positioning system based on the visible light signals according to an embodiment of the present invention.

According to some embodiments of the present invention, it provides a positioning system based on the visible light signals as shown in FIG. 40. Optionally, the device for obtaining information from visible light signals comprising an image sensor may be a mobile device containing photosensitive components. Optionally, such mobile device could be a smartphone. The light sources (e.g., in a transmitter) may be modulated to emit the above mentioned visible light signals; the emitted visible light signals contains the unique ID of the corresponding light source; an image sensor in the smartphone, captures images of the light sources, measures the pattern of stripes in these images, decodes the ID information, and compares the decoded ID with the data stored in a map database. In this way, the accurate position of the image sensor can be determined from the position of the light source.

In conclusion, the embodiments of the present invention provide an efficient and effective approach for transmitting/obtaining information, which can transmit/obtain information much faster, and the information transmitted/obtained may contain more data bits. As compared to the white light transmission having only two choices of transmitting or not transmitting white light representing "1" or "0", which can only transmit data of 1 bit during a unit of time, according to embodiments of the present invention with visible light signals of two or more wavelengths emitting light signals of multiple colors, data of more bits can be transmitted during a unit of time, for example, 8 bits data for three colors RGB. Further, taking advantages of different frequencies and/or different phases and/or different amplitudes of visible light signals, more data can be transmitted during a unit of time.

It should be noted that the aforesaid embodiments are exemplary rather than limiting the present invention, substitute an alternative embodiments may be designed by those skilled in the art without departing from the scope of the claims enclosed. The word "include" does not exclude elements or steps which are present but not listed in the claims. The word "a" or "an" preceding the elements does not exclude the presence of a plurality of such elements. In the apparatus claims that list several components, several ones among these components can be specifically embodied in the same hardware item. The use of such words as first, second, third does not represent any order, which can be simply explained as names.

The invention claimed is:

1. A method for transmitting information by visible light signals of a visible light source with light sources of different colors, the method comprising:

determining a distance and a relative position from the visible light source to an image sensor;

setting a modulating period of driving signals for the visible light source in accordance with a rolling shutter speed of the image sensor;

modulating, based on the modulating period, two or more driving signals of the light sources to obtain two or more modulated driving signals for driving the light sources to emit the visible light signals of different colors having their levels changed between peak levels and bottom levels with different frequencies and/or different phases and/or different amplitudes according to transmitting information;

emitting by the visible light source the visible light signals on the basis of the two or more modulated driving signals at the determined distance and relative position to the image sensor;

receiving an image with a series of stripes by the image sensor;

identifying within the image a beginning stripe representing a beginning of the series of stripes; and decoding from the image the transmitting information according to the series of stripes, wherein the distance and the relative position is determined such that there is the beginning stripe in every image received by the image sensor, and wherein the modulation period is set such that the series of stripes is identified in the image received by the image sensor.

2. The method according to claim 1, wherein the modulating comprises: modulating, on the basis of the information to be transmitted, two or more driving voltages or two or more driving currents of the light sources to obtain a first set of modulated driving voltages or a first set of modulated driving currents.

3. The method according to claim 2, wherein the first set of modulated driving currents are respectively greater than unmodulated driving currents, so that luminous flux of the light sources driven by the first set of modulated driving currents is equal to luminous flux of light sources driven by the unmodulated driving currents.

4. The method according to claim 2, further comprising: emitting the visible light signals on the basis of a second set of modulated driving currents which are greater than unmodulated driving currents together with a high frequency carrier wave signal, so that luminous flux of the light sources driven by the second set of modulated driving currents is constant among periods comprising peak levels and bottom levels.

5. The method according to claim 1, wherein the decoding is conducted according to number, color, brightness, or arranging order of the stripes in every image received by the image sensor.

6. The method according to claim 1, wherein the modulating comprises: modulating the frequencies and/or phases and/or amplitudes of the two or more driving signals to obtain two or more modulated driving signals.

7. A system for transmitting information by visible light signals of a visible light source with light sources of different colors, comprising:

a visible light source with a modulator and a transmission processor; and an image sensor with a receiving processor and a memory;

wherein the visible light source and the image sensor are configured to perform the following:

determining a distance and a relative position from the visible light source to an image sensor;

setting a modulating period of driving signals for the visible light source in accordance with a rolling shutter speed of the image sensor;

modulating, based on the modulating period, two or more driving signals of the light sources to obtain two or more modulated driving signals for driving the light sources to emit the visible light signals of different colors having their levels changed between peak levels and bottom levels with different frequencies and/or different phases and/or different amplitudes according to transmitting information;

emitting by the visible light source the visible light signals on the basis of the two or more modulated driving signals at the determined distance and relative position to the image sensor;

receiving an image with a series of stripes by the image sensor;

identifying within the image a beginning stripe representing a beginning of the series of stripes, and decoding from the image the transmitting information according to the series of stripes, wherein the distance and the relative position is determined such that there is the beginning stripe in every image received by the image sensor, and wherein the modulation period is set such that the series of stripes is identified in the image received by the image sensor.

* * * * *